US012738697B2

(12) United States Patent
Ebisawa et al.

(10) Patent No.: US 12,738,697 B2
(45) Date of Patent: Sep. 15, 2026

(54) ELECTRICAL CONNECTOR AND MATING ELECTRICAL CONNECTOR WITH OUTER AND INNER SHIELD PORTIONS SURROUNDING HIGH-FREQUENCY TERMINALS

(71) Applicant: Molex, LLC, Lisle, IL (US)

(72) Inventors: Jumpei Ebisawa, Yamato (JP); Masato Okano, Yamato (JP); Manabu Yamanaka, Yamato (JP); Taichi Taniguchi, Yamato (JP); Kenta Arichika, Yamato (JP); Yoshiteru Nogawa, Yamato (JP)

(73) Assignee: Molex, LLC, Lisle, IL (US)

( * ) Notice: Subject to any disclaimer, the term of this patent is extended or adjusted under 35 U.S.C. 154(b) by 618 days.

(21) Appl. No.: 18/018,272

(22) PCT Filed: Jul. 26, 2021

(86) PCT No.: PCT/IB2021/056727
§ 371 (c)(1),
(2) Date: Jan. 27, 2023

(87) PCT Pub. No.: WO2022/029554
PCT Pub. Date: Feb. 10, 2022

(65) Prior Publication Data

US 2023/0291153 A1 Sep. 14, 2023

(30) Foreign Application Priority Data

Aug. 4, 2020 (JP) ................................ 2020-132508
May 17, 2021 (JP) ................................ 2021-082928

(51) Int. Cl.
*H01R 13/6594* (2011.01)
*H01R 12/71* (2011.01)
(Continued)

(52) U.S. Cl.
CPC ....... *H01R 13/6594* (2013.01); *H01R 12/714* (2013.01); *H01R 12/716* (2013.01);
(Continued)

(58) Field of Classification Search
CPC .. H01R 13/6594; H01R 12/714; H01R 13/20; H01R 13/6582; H01R 12/71;
(Continued)

(56) References Cited

U.S. PATENT DOCUMENTS

2010/0330821 A1 12/2010 Takeuchi et al.
2018/0175561 A1* 6/2018 Chen ...................... H01R 12/52
(Continued)

FOREIGN PATENT DOCUMENTS

CN 104577587 B 1/2018
CN 110247261 A 9/2019
(Continued)

OTHER PUBLICATIONS

International Preliminary Report on Patentability received for PCT application No. PCT/IB2021/056727, mailed on Feb. 16, 2023, 08 Pages.
(Continued)

*Primary Examiner* — Justin M Kratt

(57) ABSTRACT

To exhibit high strength, achieve a high shielding effect, and increase reliability with a compact and low profile. A first connector that mates with a second connector, containing: a first connector main body; a first terminal attached to the first connector main body; a first high-frequency terminal attached to the first connector main body; and a first shield surrounding an entire circumference of the first connector main body; and further containing, a first inner side shield attached to the first connector main body and extending in a width direction of the first connector between the first terminal and the first high-frequency terminal; where a
(Continued)

substrate connecting part of the first terminal is visible from a mating surface side of the first connector, and a substrate connecting part of the first inner side shield is not visible from the mating surface side.

19 Claims, 28 Drawing Sheets

(51) Int. Cl.

| | |
|---|---|
| ***H01R 13/20*** | (2006.01) |
| ***H01R 13/6582*** | (2011.01) |
| *H01R 12/73* | (2011.01) |
| *H01R 13/648* | (2006.01) |
| *H01R 13/658* | (2011.01) |
| *H01R 13/6581* | (2011.01) |
| *H01R 13/6585* | (2011.01) |
| *H01R 13/6591* | (2011.01) |

(52) U.S. Cl.

CPC ......... *H01R 13/20* (2013.01); *H01R 13/6582* (2013.01); *H01R 12/71* (2013.01); *H01R 12/712* (2013.01); *H01R 12/73* (2013.01); *H01R 13/648* (2013.01); *H01R 13/658* (2013.01); *H01R 13/6581* (2013.01); *H01R 13/6585* (2013.01); *H01R 13/6591* (2013.01)

(58) Field of Classification Search

CPC .... H01R 12/712; H01R 12/73; H01R 13/648; H01R 13/658; H01R 13/6581; H01R 13/6585; H01R 13/6591

See application file for complete search history.

(56) References Cited

U.S. PATENT DOCUMENTS

| | | | | |
|---|---|---|---|---|
| 2018/0198241 | A1* | 7/2018 | Ooi | H01R 13/6597 |
| 2019/0305487 | A1 | 10/2019 | Ozeki | |
| 2020/0244011 | A1 | 7/2020 | Kitazawa | |
| 2021/0218200 | A1* | 7/2021 | Shimomura | H01R 12/73 |
| 2022/0360023 | A1* | 11/2022 | Kim | H01R 12/73 |
| 2023/0104947 | A1* | 4/2023 | Oh | H01R 12/73 439/74 |

FOREIGN PATENT DOCUMENTS

| | | | |
|---|---|---|---|
| CN | 111490409 | A | 8/2020 |
| EP | 0654867 | B1 | 11/1998 |
| JP | H10172685 | A | 6/1998 |
| JP | 2007035291 | A | 2/2007 |
| JP | 2011134660 | A | 7/2011 |
| JP | 2012178248 | A | 9/2012 |
| JP | 2012186110 | A | 9/2012 |
| JP | 2016081632 | A | 5/2016 |
| JP | 2016177884 | A | 10/2016 |
| JP | 2017033654 | A | 2/2017 |
| JP | 2017208165 | A | 11/2017 |
| JP | 6256426 | B2 | 1/2018 |
| JP | 2019530164 | A | 10/2019 |
| JP | 6628685 | B2 | 1/2020 |
| JP | 2020102462 | A | 7/2020 |
| JP | 2021093346 | A | 6/2021 |
| JP | 2021111598 | A | 8/2021 |
| TW | 202029595 | A | 8/2020 |
| WO | 2009061507 | A2 | 5/2009 |
| WO | 2020150075 | A1 | 7/2020 |

OTHER PUBLICATIONS

International Search Report and Written Opinion received for PCT application No. PCT/IB2021/056727, mailed on Oct. 27, 2021, 10 Pages.

* cited by examiner (a)

(b)

(c)

(b)

(a)

(b)

(c)

Prior art

ELECTRICAL CONNECTOR AND MATING ELECTRICAL CONNECTOR WITH OUTER AND INNER SHIELD PORTIONS SURROUNDING HIGH-FREQUENCY TERMINALS

RELATED APPLICATIONS

This application is a national phase of PCT/IB2021/056727, filed Jul. 26, 2021, which claims priority to Japanese Patent application no. 2020-132508, filed Aug. 4, 2020 and Japanese Patent Application No. 2021-082928 filed May 17, 2021, which are incorporated herein by reference in their entireties.

TECHNICAL FIELD

The present disclosure relates to a connector and a connector pair.

BACKGROUND ART

Connectors such as substrate-to-substrate connectors have been used to electrically connect pairs of parallel circuit boards to each other. Such connectors are attached to each of opposing surfaces of the pair of circuit boards, and fitted together to secure electric conduction. Furthermore, in order to reduce the influence of noise and radio waves from the outside and also to suppress the emission of noise and radio waves to the outside, a technique of providing a shielding member has been proposed (for example, refer to Patent Document 1).

FIG. 28 is a perspective view illustrating a conventional connector.

In the drawing, 811 represents a housing of a receptacle connector serving as a connector mounted on a surface of a first circuit board (not shown), which has a mating recess 812 into which a plug connector mounted on a surface of a second circuit board (not shown) is inserted and mated. Four sides of the mating recess 812, which has a rectangular shape in plan view, are demarcated by side wall parts 814. Furthermore, in the mating recess 812, a pair of protrusions 813 are formed protruding from a bottom plate 818 thereof. Note that an opening part 818*a* is formed in the bottom plate 818 between the protrusions 813.

Furthermore, a plurality of terminals 861 are respectively attached to each of the protrusions 813 aligned in a longitudinal direction of the protrusions 813. Each terminal 861 has a contacting part 865 protruding from an inner wall surface of the side wall part 814 and a tail part 862 protruding from the protrusion 813 into the opening part 818*a*. The tail part 862 is soldered to a connection pad formed on a surface of the first circuit board. Furthermore, when the receptacle connector is mated with the plug connector, the contacting part 865 contacts a terminal of the plug connector to conduct electricity.

Furthermore, a conductive shell 851 is attached to the housing 811 so as to entirely cover an outer wall surface of the side wall part 814. The conductive shell 851 has a plurality of substrate connecting parts 851*a*, and the substrate connecting parts 851*a* are soldered to the connection pad formed on a surface of the first circuit board. Thus, an outer circumferential surface of the housing 811 is covered by the conductive shell 851. Therefore, an electromagnetic shielding action by the conductive shell 851 is achieved for the receptacle connector and for the plug connector inserted in and mated to the mating recess 812.

Prior Art Documents: Patent Documents: Patent Document 1 Japanese Unexamined Patent Application 2016-177884

SUMMARY

Problems to be Solved by the Invention

However, this type of conventional connector can not handle the size reduction and increased signal speeds of recent electronic devices. In electronic devices such as laptop computers, tablets, smart phones, digital cameras, music players, game machines, navigation devices, and the like, a compact and low-profile housing and accompanying compact and low-profile components are required, and a high-speed signal is required to handle an increase in the amount of communication data and a higher communication speed and data processing speed. However, the aforementioned conventional connector cannot sufficiently respond to the demand for a compact and low-profile connector because the dimensions of each part of the housing 811 are large and the strength is insufficient when the dimensions of each part are reduced. Furthermore, the speed of various types of signals is increasing, and transmitting high-frequency signals is sometimes required, but the aforementioned conventional connector cannot transmit high-frequency signals because the electromagnetic shielding function is not sufficiently high.

Herein, in order to solve the problems of the conventional connector, an object of the present invention is to provide a highly reliable connector and connector pair that exhibit high strength and achieve a high shielding effect while having a compact and low profile.

Means for Solving the Problems

Therefore, a first connector is a first connector that mates with a second connector, containing: a first connector main body; a first terminal attached to the first connector main body; a first high-frequency terminal attached to the first connector main body; and a first shield surrounding an entire circumference of the first connector main body; and further containing, a first inner side shield attached to the first connector main body and extending in a width direction of the first connector between the first terminal and the first high-frequency terminal; where a substrate connecting part of the first terminal is visible from a mating surface side of the first connector, and a substrate connecting part of the first inner side shield is not visible from the mating surface side.

In another first connector, the first shield contains: an outer wall; an inner wall that is essentially parallel to the outer wall, on an inner side of the outer wall; a coupling part that connects an upper end of the outer wall and an upper end of the inner wall; an outwardly extending flange part connected to a lower end of the outer wall; and a stowing part with a circumference surrounded by the inner wall, and that contains the second connector, the inner wall contains a linear part and a curved part, and the linear part is deformable in a direction approaching or separating from the outer wall.

Furthermore, in another first connector, the outer wall and flange part are connected around the entire circumference of the first connector main body.

Furthermore, in another first connector, the linear part and curved part of the inner wall are separated by a slit part, and the first connector main body is connected to the linear part.

Furthermore, in another first connector, an upper surface of the substrate connecting part of the first inner side shield is covered with the first connector main body, and a lower surface of the substrate connecting part of the first inner side shield is exposed.

Furthermore, in another first connector, the first inner side shield has the same shape as the first terminal.

A second connector is a second connector that mates with a first connector, containing: a second connector main body; a second terminal attached to the second connector main body; a second high-frequency terminal attached to the second connector main body; and a second shield surrounding an entire circumference of the second connector main body; and further containing, a second inner side shield attached to the second connector main body and extending in a width direction of the second connector between the second terminal and the second high-frequency terminal; where a substrate connecting part of the second inner side shield is disposed at a position overlapping the substrate connecting part of the second terminal as viewed from a longitudinal direction of the second connector.

In another second connector, the second shield contains: an outer wall; an upper wall; and an outwardly extending flange part connected to a lower end of the outer wall, the second connector main body contains a protruding end part disposed at two ends in the longitudinal direction of the second connector, and the upper wall covers at least a portion of an upper surface of the protruding end part.

Furthermore, in another second connector, the outer wall and flange part are connected around the entire circumference of the second connector main body.

Furthermore, in another second connector, the second inner side shield is connected to the upper wall, the second high-frequency terminal is attached to the protruding end part, and the entire circumference of the second high-frequency terminal is surrounded by the outer wall and the second inner side shield.

Furthermore, in another second connector, the second inner side shield has the same shape as the second terminal.

A connector pair is a connector pair, containing: a first connector containing: a first connector main body; a first terminal attached to the first connector main body; a first high-frequency terminal attached to the first connector main body; and a first shield surrounding an entire circumference of the first connector main body; and a second connector that mates with the first connector, containing: a second connector main body; a second terminal attached to the second connector main body; a second high-frequency terminal attached to the second connector main body; and a second shield surrounding an entire circumference of the second connector main body; wherein the first connector further contains a first inner side shield attached to the first connector main body and extending in a width direction of the first connector between the first terminal and the first high-frequency terminal, the second connector further contains a second inner side shield attached to the second connector main body and extending in a width direction of the second connector between the second terminal and the second high-frequency terminal when the first connector and the second connector are mated, the first shield and the second shield are in contact and electrically conducting, and the first inner side shield and the second inner side shield are in contact and electrically conducting.

Effects of the Invention

According to the present disclosure, a connector and connector pair can exhibit high strength, achieve a high shielding effect, and have improved reliability while having a compact and low profile.

DETAILED DESCRIPTION OF THE PREFERRED EMBODIMENTS

Embodiment 1 will hereinafter be described in detail with reference to the drawings.

Figure 1:
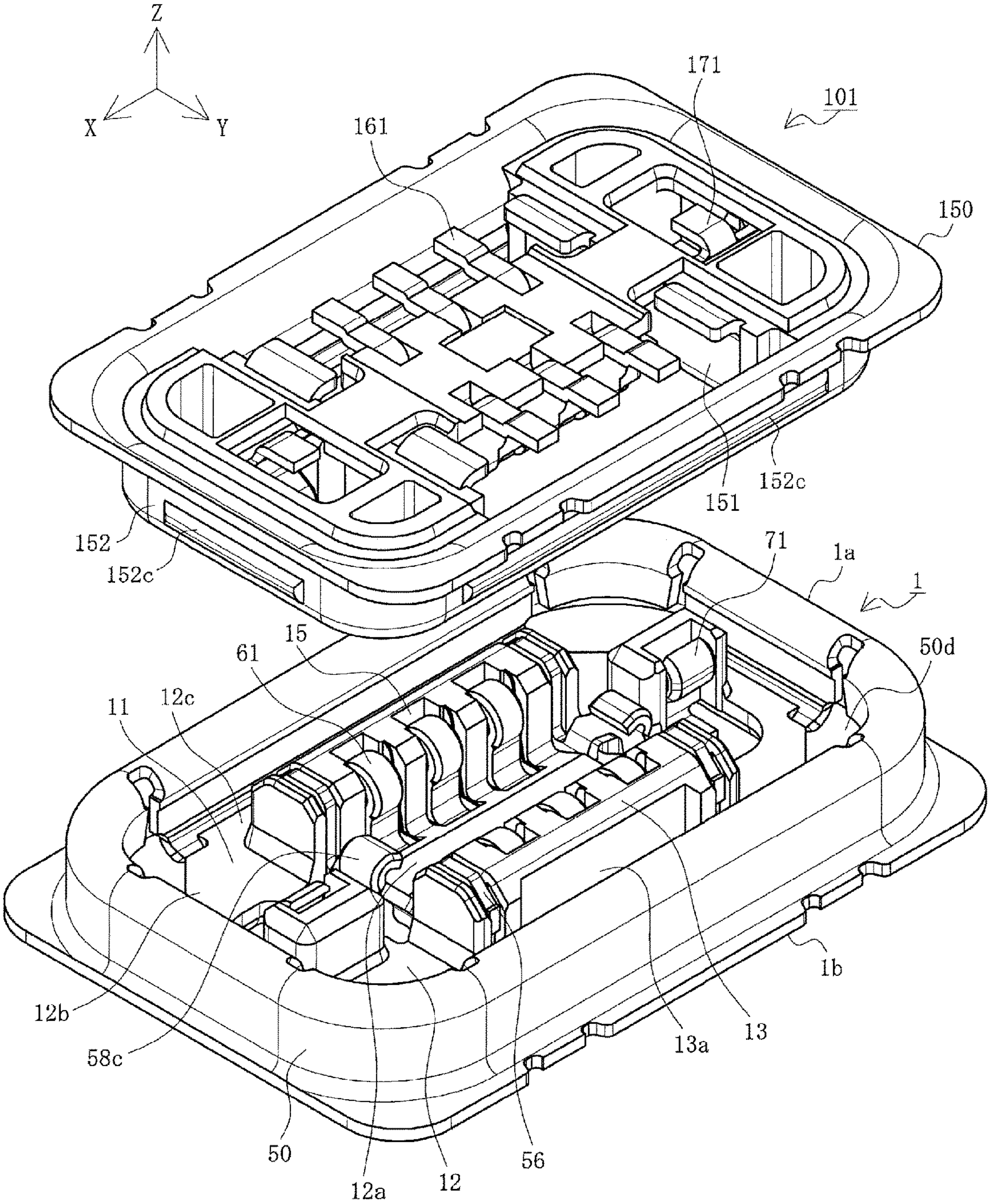
FIG. 1 is a perspective view of a first connector and a second connector according to Embodiment 1 prior to mating.
Figure 2:
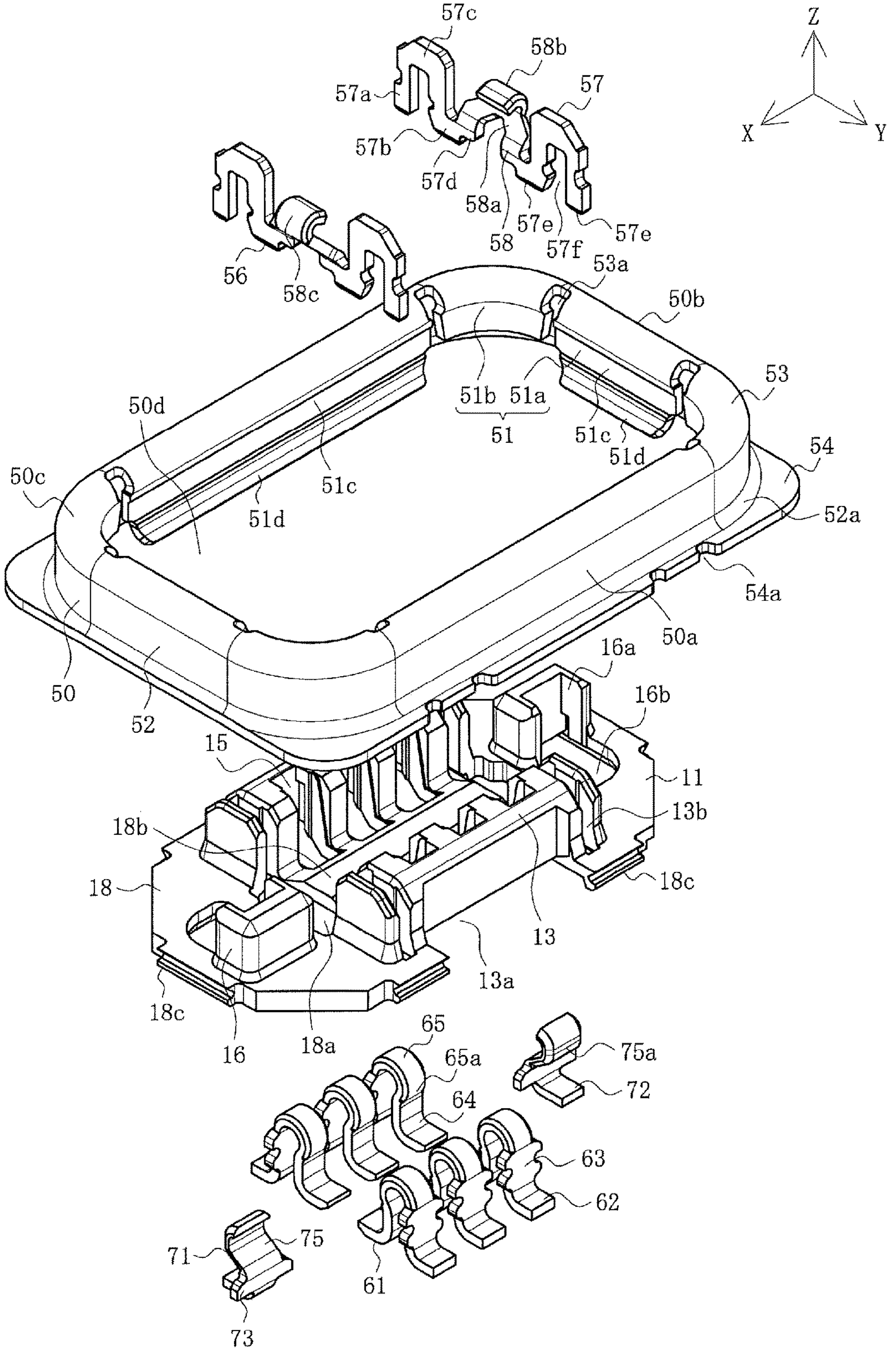
FIG. 2 is an exploded view illustrating the first connector according to Embodiment 1.
Figure 3:
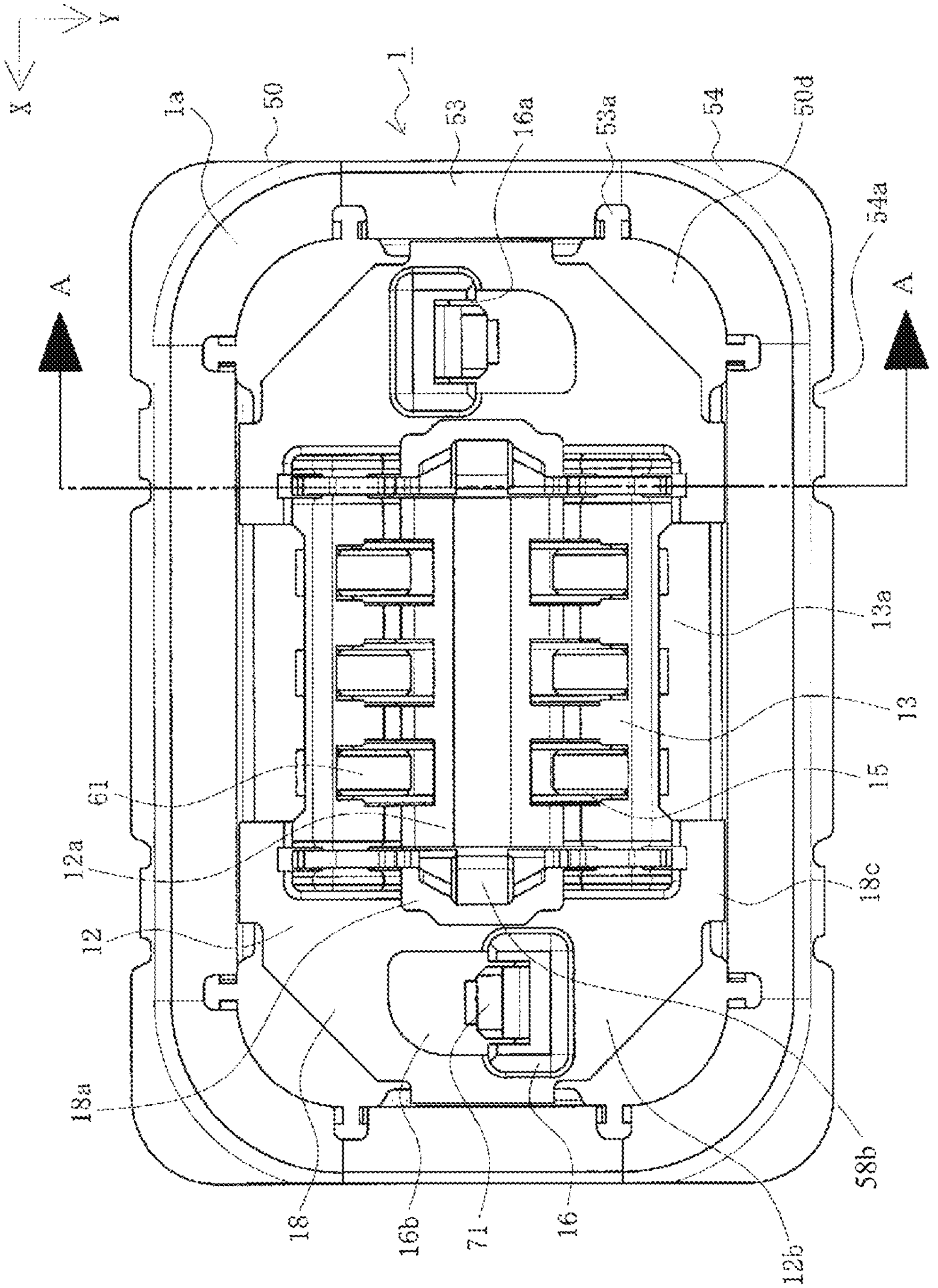
FIG. 3 is an upper surface view illustrating the first connector according to Embodiment 1.
Figure 4:
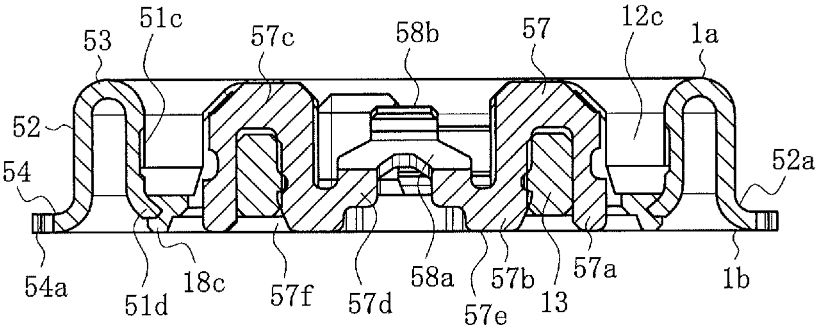
FIG. 4 is views describing a portion viewed along arrow A-A of the first connector according to Embodiment 1, where (a) is a lateral cross-sectional view of the portion viewed along arrow A-A in FIG. 3, (b) is a perspective view illustrating a cross section of the portion viewed along arrow A-A in FIG. 3, and (c) is a perspective view illustrating a periphery of the portion viewed along arrow A-A in FIG. 3.
Figure 4:
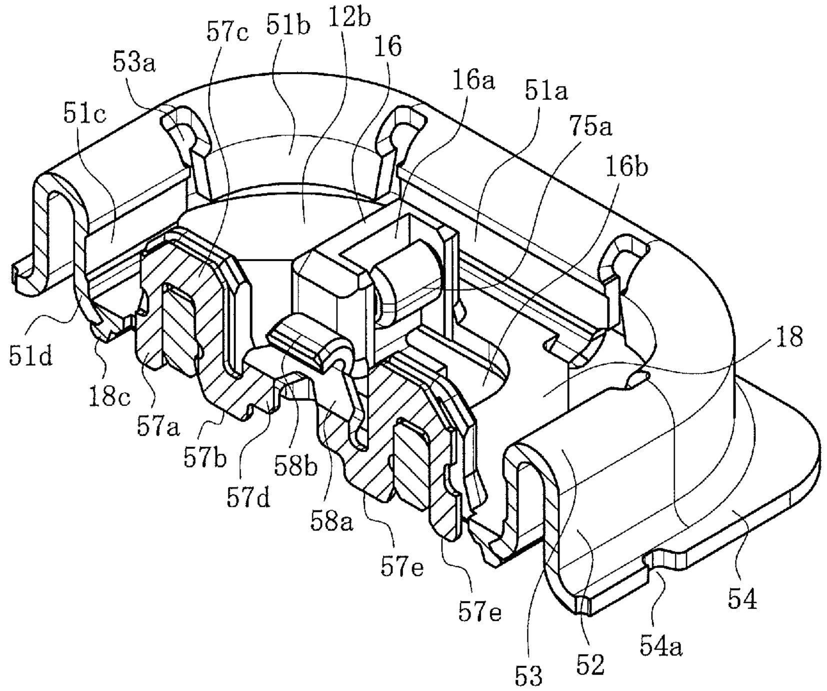
Figure 4:
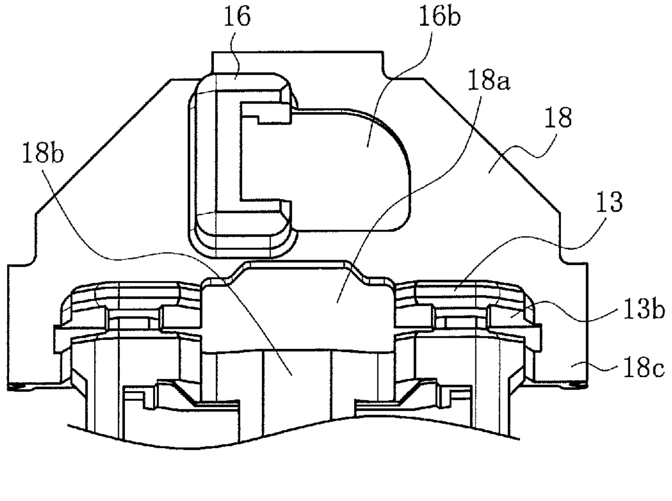
Figure 5:
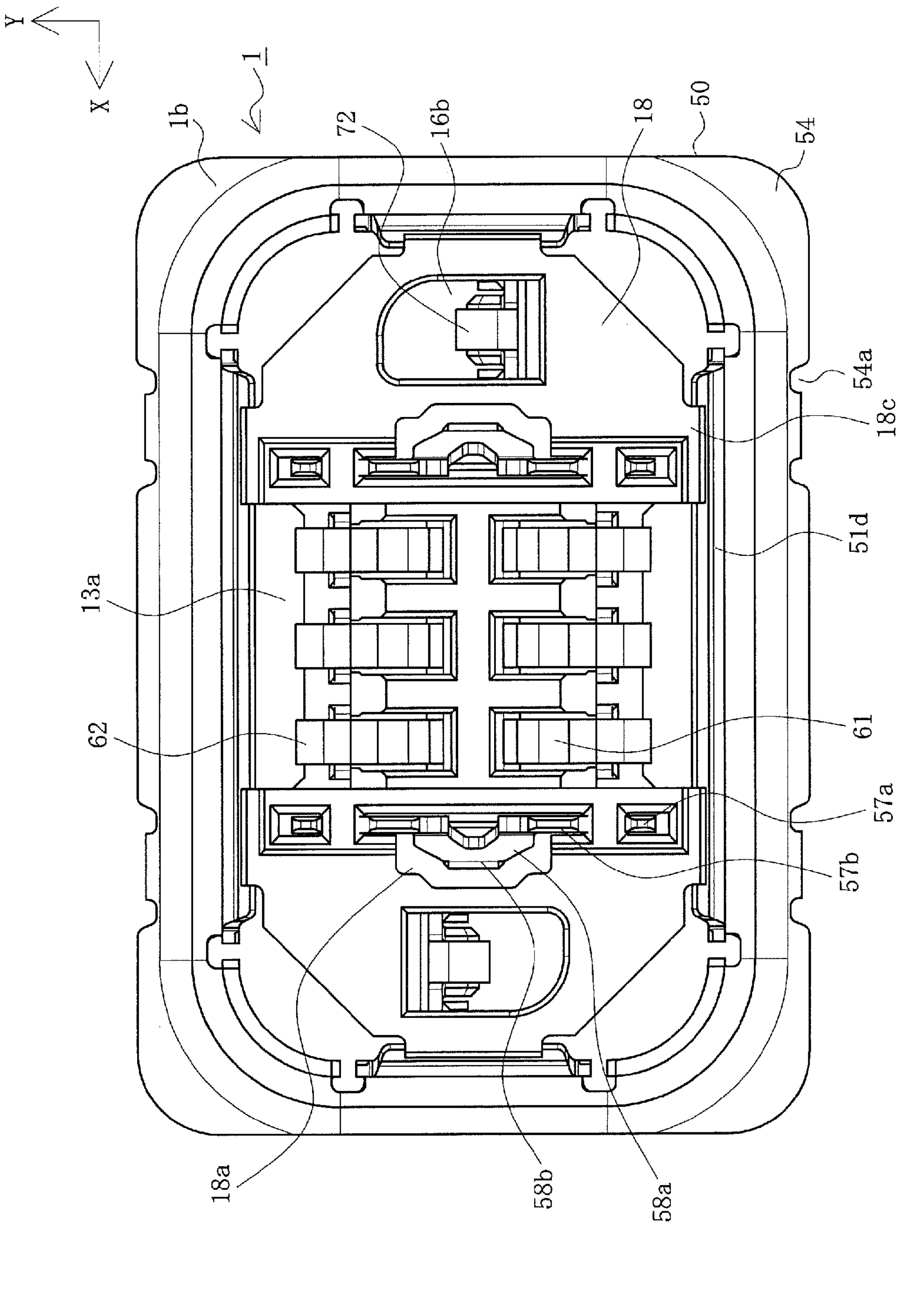
FIG. 5 is a lower surface view illustrating the first connector according to Embodiment 1.

FIG. 1 is a perspective view of a first connector and a second connector according to Embodiment 1 prior to mating; FIG. 2 is an exploded view of the first connector according to Embodiment 1; FIG. 3 is an upper surface view of the first connector according to Embodiment 1; FIG. 4 is a view describing a portion viewed along arrows A-A of the first connector according to Embodiment 1; and FIG. 5 is a lower surface view of the first connector according to Embodiment 1. Note that in FIG. 4, (a) is a lateral cross-sectional view of the portion viewed along arrow A-A in FIG. 3, (b) is a perspective view illustrating a cross-sectional view of the portion viewed along arrow A-A in FIG. 3, and (c) is a perspective view illustrating a periphery of the portion viewed along arrow A-A in FIG. 3.

In the drawings, 1 represents a first connector as one of a pair of substrate-to-substrate connectors, which are connectors in the present embodiment. The first connector 1 is a surface mounting type receptacle connector mounted on a surface of a first substrate (not shown) serving as a mounting member and is mated together with a second connector 101 serving as a mating connector. Furthermore, the second connector 101 is the other of the pair of substrate-to-substrate connectors and is a surface mounting type plug connector mounted on a surface of a second substrate (not shown) serving as a mounting member.

Note that the first connector 1 and the second connector 101 of the connector pair according to the present embodiment are preferably used to electrically connect the first substrate to the second substrate but can also be used to electrically connect other members. For example, the first substrate and the second substrate each are a printed circuit board, a flexible flat cable (FFC), a flexible circuit board (FPC) or the like as used in electronic devices or the like, but may be any type of substrate.

Furthermore, in the present embodiment, expressions indicating direction such as up, down, left, right, front, rear, and the like used to describe a configuration and operation of each part of the connector pair first connector 1 and the second connector 101 are relative rather than absolute and are appropriate when each part of the first connector 1 and the second connector 101 are in positions illustrated in the drawings. However, these directions should be interpreted as changing in accordance with a change in position when the position thereof is changed.

Furthermore, the first connector 1 has: a first shield 50 as a first outer side shield, which is a receptacle shield formed by punching, drawing, or the like on a conductive metal plate; and a first housing 11 as a first connector main body integrally formed by an insulating material such as a synthetic resin or the like. The first housing 11 has: a flat bottom plate 18; and first protrusions 13 serving as a pair of protrusions protruding upwardly from an upper surface of the bottom plate 18. The first protrusions 13 as a whole is positioned more to an inner side in a width direction (Y-axis direction) of the first connector 1 than two side ends of the bottom plate 18.

Each of the first protrusions 13 is an essentially rectangular member extending in a longitudinal direction (X-axis direction) of the first connector 1, and a plurality of first terminal stowing cavities 15 (three in the example illustrated in the drawings) are formed in the longitudinal direction at a predetermined pitch (for example, 0.35 [mm]) from inner side surfaces facing each other to an upper surface. Note that the pitch and the number of the first terminal stowing cavities 15 can be changed as appropriate. Furthermore, a plurality of first terminals 61 serving as terminals which are housed in each of the first terminal stowing cavities 15 and installed on the first housing 11 are disposed on two sides of each first protrusion 13 at the same pitch. In other words, a plurality of the first terminals 61 are disposed along each first protrusion 13 to form a pair of parallel terminal group rows. Note that the first terminal stowing cavity 15 is formed so as to penetrate the bottom plate 18 in a plate thickness direction (Z-axis direction).

Furthermore, shield plate stowing slits **13*b* serving as slits are respectively formed in the vicinity of two ends in the longitudinal direction of the first protrusions 13. The shield plate stowing slits 13*b* stow a shield plate 56 serving as a first inner side shield. In the example illustrated in the drawings, the shield plate stowing slits 13*b* extend continuously from the upper surface of the first protrusions 13 to the inner side surface and the outer side surface and is further formed so as to penetrate the bottom plate 18 in the plate thickness direction from the inner side surface and outer side surface. Note that the bottom plate 18 between the first protrusions 13 is a thick wall part 18*b* whose thickness (dimension in the Z-axis direction) is thicker than another location and as illustrated in FIG. 4**(*c*), a shield plate stowing opening **18*a* serving as an opening penetrating in the plate thickness direction is formed at a position corresponding to the shield plate stowing slits 13*b* and in the vicinity thereof with regard to the longitudinal direction of the first connector 1**.

Furthermore, in an outer side in the width direction of the first connector 1 in the first protrusion 13, an outer side recess **13*a* is formed, which recesses inwardly, in a range closer to a center in the longitudinal direction than the shield plate stowing slits 13*b*. The outer side recess 13*a* is formed so as to extend in an vertical direction (Z-axis direction) from the upper surface of the first protrusions 13 to the lower surface of the bottom plate 18, such that the bottom plate 18 is not present on the outer side of the width direction of the first connector 1 from the outer side recess 13***a*.

Furthermore, first high-frequency terminal supporting parts 16 serving as a pair of supporting parts protruding upwardly from the upper surface of the bottom plate 18 are formed more on an outer side of the shield plate stowing opening 18*a* with regard to the longitudinal direction of the first connector 1. The first high-frequency terminal supporting parts 16 have a shape when viewed from above that is an essentially U-shaped columnar member as illustrated in FIG. 3 and have a first high-frequency terminal stowing groove 16*a* serving as a high-frequency terminal stowing groove extending in the vertical direction. The first high-frequency terminal supporting parts 16 are disposed such that openings of the respective first high-frequency terminal stowing grooves 16*a* face opposite directions and, as illustrated in FIG. 3, are disposed so as to be point-symmetrical with regard to a center of the first connector 1 when viewed from above, in other words, in a plan view, and so as to be separated from the center of the first connector 1 in the width direction and deflected to an outer side in the width direction. Furthermore, a first high-frequency terminal 71 serving as a high-frequency terminal is stowed in the first high-frequency terminal stowing grooves 16*a*. Furthermore, first high-frequency terminal stowing openings 16*b* serving as an opening penetrating the bottom plate 18 in the plate thickness direction is formed below and in front of the first high-frequency terminal stowing grooves 16*a*.

Furthermore, a connecting end 18*c*, which is connected to the first shield 50, is present at an outermost end of the bottom plate 18 with regard to the longitudinal direction and the width direction of the first connector 1. The first shield 50 is integrated with the first housing 11 by overmolding or insert molding. In other words, the first housing 11 is molded by filling a cavity of a mold, in which the first shield 50 is set inside in advance, with an insulating material such as synthetic resin or the like, and is integrally connected to the first shield 50 at the connecting end 18*c*.

The first shield 50 is a member integrally formed by punching, drawing, or the like on a conductive metal plate, and as illustrated in FIG. 3, is an essentially rectangular frame shaped member when viewed from above, in other words, in plan view, which surrounds an entire circumference of the first housing 11. Furthermore, the first shield 50 contains: a pair of long side parts 50*a* extending linearly in the longitudinal direction of the first connector 1; a pair of short side parts 50*b* extending linearly in the width direction of the first connector 1; and four corner parts 50*c* bent approximately 90 degrees connecting one end of the long side part 50*a* and one end of the short side part 50*b*.

Furthermore, the first shield 50 contains: an outer wall 52; an inner wall 51 essentially parallel to the outer wall 52 on an inner side of the outer wall 52; and a coupling part 53 that connects and integrates an upper end of the outer wall 52 with an upper end of the inner wall 51. While the outer wall 52 is a continuous wall over an entire circumference, the inner wall 51 is separated into a linear part 51*a* and a curved part 51*b* by slit parts 53*a* formed at two ends of each corner part 50*c*. The linear part 51*a* is a linear portion in plan view and corresponds to the long side part 50*a* and the short side part 50*b*. Furthermore, the curved part 51*b* is a curved portion in plan view and corresponds to the corner part 50*c*. Note that the slit part 53*a* is a notch that starts at an upper end of the coupling part 53, extends downwardly through the inner wall 51, and is opened at a lower end of the inner wall 51. Therefore, in the coupling part 53, a portion adjacent to the outer wall 52 is continuous over an entire circumference, while a portion adjacent to the inner wall 51 is separated by the slit part 53*a* into portions corresponding to the long side part 50*a* and the short side part 50*b* and a portion corresponding to the corner part 50*c*. Note that an enclosed space surrounded on the circumference by the portions corresponding to the long side part 50*a*, the short side part 50*b* and the corner part 50*c* of the inner wall 51 is a stowing part 50*d* in which the second connector 101, which is a plug connector, is inserted and stowed.

Furthermore, the linear part 51*a* of the inner wall 51 has: a bent end part 51*d* connected to a lower end thereof and an engaging recess 51*c* formed above the bent end part 51*d*. The bent end part 51*d* is a portion bent such that a tip end thereof points inward diagonally and downward of the stowing part 50*d*, and the connecting end 18*c* of the bottom plate 18 is connected to a portion thereof. In other words, the linear part 51*a* is connected to the first housing 11. In contrast, the curved part 51*b* does not have the bent end part 51*d* and is not connected to the first housing 11. Furthermore, the engaging recess 51*c* is a portion that engages with an engaging protrusion 152*c* formed on an outer wall 152 of a second shield 150 provided by the second connector 101 when the first connector 1 and the second connector 101 are mated together and extends linearly in the longitudinal or width direction of the first connector 1. As described above, each linear part 51*a* is relatively flexible and can be elastically deformed in a direction of approaching or separating from the outer wall 52, since two ends are separated from the another portion by the slit part 53*a*.

A flange part 54 serving as an outwardly extending flat part is connected to the lower end of the outer wall 52 through the bent part 52*a* bent at an angle of approximately 90 degrees. The bent part 52*a* and the flange part 54 are connected to the lower end of the outer wall 52 in a continuous manner around the entire circumference. Note that in the example illustrated in the drawings, a small notch 54*a* is formed in a plurality of locations on the flange part 54, but the notch 54*a* can be omitted as appropriate.

The flange part 54 functions as a substrate connecting part, a lower surface of which is parallel to the surface of the first substrate and is a portion connected by soldering or the like to the connection pad on the surface. The connection pad is typically connected to a ground line. Furthermore, the outer wall 52, in addition to being a continuous wall over the entire circumference itself, is connected to a portion where an upper end thereof is continuous at the coupling part 53, which is a portion a location extending in a direction orthogonal to the outer wall 52 in a cross section as illustrated in FIG. 4(*a*) and is connected to a member where a lower end thereof is continuous as with the flange part 54, which is a member extending in a direction orthogonal to the outer wall 52 in the cross section as illustrated in FIG. 4(*a*). Therefore, the outer wall 52 is relatively rigid and resistant to deformation. In the present embodiment, an example is described where the flange part 54 is connected to the lower end of the outer wall 52 continuously over the entire circumference, but the flange part 54 may be connected only to a portion if relatively high rigidity is not required.

Furthermore, when the first housing 11 is connected to the first shield 50 in the stowing part 50*d*, a first recess 12 that mates with the second connector 101 is formed in the stowing part 50*d*, which is a recess with a circumference surrounded by the inner wall 51 and a lower portion is demarcated by the bottom plate 18. Furthermore, an inner recessed groove part 12*a*, which is an elongated recess part extending in the longitudinal direction of the first connector 1, is formed between the pair of first protrusions 13 as a portion of the first recess 12. Furthermore, an outer recessed groove part 12*c*, which is an elongated recessed part extending in the longitudinal direction of the first connector 1, is formed between the first protrusions 13 and the inner wall 51 as a portion of the first recess 12. Furthermore, mating recesses 12*b* are formed at two outer ends of the first protrusion 13 with regard to the longitudinal direction of the first connector 1 as a portion of the first recess 12.

The first terminal 61 is a member integrally formed by punching, bending, or the like on a conductive metal plate, and has: a retained part 63; a tail part 62 serving as a substrate connecting part connected to a lower end of the retained part 63; an upper side connecting part 65 connected to an upper end of the retained part 63; and a lower side connecting part 64 connected to a lower end of the upper side connecting part 65.

The retained part 63 extends in the vertical direction (Z-axis direction) and is a portion that is press-fitted and retained in the first terminal stowing cavity 15. Note that the first terminal 61 is not necessarily attached to the first housing 11 by press fitting, but may be integrated with the first housing 11 by overmolding or insert molding. Herein, for convenience of description, a case in which the retained part 63 is pressed into and retained by the first terminal stowing cavity 15 will be described.

The tail part 62 is bent and connected to the retained part 63, extends in a left-right direction (Y-axis direction), in other words, outward in the width direction of the first connector 1, and is connected to the connection pad connected to a conductive trace of the first substrate by soldering or the like. Note that the conductive trace may be a power line that supplies power but is typically a signal line. Furthermore, the signal line is described assuming that the signal line does not transmit a high-frequency signal, but rather transmits a signal of normal frequency (for example, frequency less than 10 [GHz]), which is lower in frequency than high-frequency signals. Note that the tail part 62 is visible when viewed from a mating direction of the first connector 1, in other words, from a mating surface 1*a* side.

The upper side connecting part 65 is a portion bent by approximately 180 degrees so as to protrude upwardly (Z-axis positive direction). A lower side connecting part 64 extending downwardly (Z-axis negative direction) is connected to a lower end of the upper side connecting part 65 on an opposite side from the retained part 63. Note that a lower part of the lower side connecting part 64 is preferably bent such that a tip end thereof faces inward in the width direction of the first connector 1. Furthermore, a bent contacting part 65*a* is formed in the vicinity of a lower end of the upper side connecting part 65 so as to bulge inward in the width direction of the first connector 1. The contacting part 65*a* is a portion that contacts a second terminal 161 provided by the second connector 101.

The first terminal 61 is press-fitted into the first terminal stowing cavity 15 from a mounting surface 1*b* side, which is a lower surface (Z-axis negative direction surface) of the first connector 1, and is fixed to the first housing 11 based on the retained part 63 being sandwiched from two sides by inner side surfaces of the first terminal stowing cavity 15. In this state, in other words, in a state in which the first terminal 61 is installed in the first housing 11, the contacting parts 65*a* protrude from an inner side surface of each first protrusion 13 into the inner recessed groove part 12*a* and face each other.

The first high-frequency terminal 71 is a member integrally formed by punching, bending, or the like on a conductive metal plate, and has a retained part 73, a tail part 72 serving as a substrate connecting part connected to a lower end of the retained part 73, and an upper side connecting part 75 connected to an upper end of the retained part 73.

Furthermore, the retained part 73 extends in the vertical direction (Z-axis direction) and is a portion that is press-fitted and retained in the first high-frequency terminal stowing groove 16*a*. As described above, the first high-frequency terminal supporting parts 16 are disposed such that the openings of the respective first high-frequency terminal stowing grooves 16*a* face opposite directions, and therefore, the first high-frequency terminals 71 retained in the first high-frequency terminal stowing grooves 16*a* by the retained part 73 are also in a position so as to face each other in opposite directions. Note that the first high-frequency terminal 71 is not necessarily attached to the first housing 11 by press fitting but may be integrated with the first housing 11 by overmolding or insert molding. Herein, for convenience of description, a case in which the retained part 73 is pressed into and retained by the first high-frequency terminal stowing groove 16*a* will be described.

The tail part 72 is bent and connected to the retained part 73, extends in a left-right direction (Y-axis direction), in other words, toward the center in the width direction of the first connector 1, and is connected to the connection pad connected to a conductive trace of the first substrate by soldering or the like. Note that the aforementioned conductive traces are signal lines, which are typically described as transmitting high-frequency signals of high frequency (for example, frequency of 10 [GHz] or higher), such as RF signals.

Furthermore, the upper side connecting part 75 is bent in an approximate S-shape when viewed from the longitudinal direction of the first connector 1, and a portion bent so as to bulge out toward the center in the width direction of the first connector 1 functions as a contacting part 75*a*. The contacting part 75*a* is a portion that contacts a second high-frequency terminal 171 provided by the second connector 101.

The first high-frequency terminal 71 is press-fitted from the mounting surface 1*b* side into the first high-frequency terminal stowing groove 16*a* of the first high-frequency terminal supporting part 16 positioned in the mating recess 12*b* and is fixed to the first housing 11 based on the retained part 73 being sandwiched from two sides by inner side surfaces of the first high-frequency terminal stowing groove 16*a*. In this state, in other words, in a state in which the first high-frequency terminals 71 are installed in the first housing 11, the contacting parts 75*a* of the pair of first high-frequency terminals 71 face mutually opposite directions.

The shield plate 56 is a member integrally formed by punching, bending, or the like on a conductive metal plate, and has: a center part 58; and a pair of side parts 57 connected to two sides of the center part 58.

Furthermore, the center part 58 has an essentially inverted Y-shape when viewed in the longitudinal direction of the first connector 1. However, when viewed in the width direction of the first connector 1, the center part 58 is not upright in the vertical direction but is in a posture inclined to an outer side in the longitudinal direction of the first connector 1. Furthermore, the center part 58 includes one bent part 58*b* and two inclined leg parts 58*a* extending so as to branch from a lower end of the bent part 58*b*. The lower end of each inclined leg part 58*a* is connected to an adjacent side part 57. The bent part 58*b* is curved so as to expand to an outer side in the longitudinal direction of the first connector 1 and such that a tip end thereof faces towards an inner side in the longitudinal direction of the first connector 1. Furthermore, an outer surface of the bent part 58*b* that bulges to an outer side in the longitudinal direction of the first connector 1 functions as the contacting part 58*c* and contacts the inner wall 151 of the second shield 150 provided by the second connector 101.

Furthermore, the side part 57 has an upright posture in the vertical direction when viewed from the width direction of the first connector 1. Furthermore, each of the side parts 57 has: an outer side part 57*a* extending linearly in the vertical direction; an inner side part 57*b* that is essentially L-shaped when viewed from the longitudinal direction of the first connector 1; and an upper side part 57*c* connecting an upper end of the outer side part 57*a* with an upper end of the inner side part 57*b*. Furthermore, the inner side part 57*b* contains a connecting part 57*d* extending toward an inner side in the width direction of the first connector 1, and an upper end of the connecting part 57*d* in the upright posture in the vertical direction is connected to a lower end of the inclined leg part 58*a* in the posture inclined to an outer side in the longitudinal direction of the first connector 1. Note that a space with a circumference demarcated by the outer side part 57*a*, the inner side part 57*b* and the upper side part 57*c* functions as a retained recess 57*f*. Furthermore, lower ends of the outer side part 57*a* and inner side part 57*b* function as a tail part 57*e*, which is a substrate connecting part, and is a portion that is connected to a connection pad of the first substrate by soldering or the like. The connection pad is typically connected to a ground line. Note that the tail part 57*e* is not visible when viewed from a mating direction of the first connector 1, in other words, from a mating surface 1*a* side.

The shield plate 56 is press-fitted into the shield plate stowing slits 13*b* from the mating surface 1*a* side, which is an upper surface (Z-axis positive surface) of the first connector 1, and is fixed to the first housing 11 based on the retained recess 57*f* sandwiching a side surface of the first protrusion 13 in the shield plate stowing slits 13*b* from two sides. In this state, in other words, in a state in which the shield plate 56 is installed into the first housing 11, the contacting part 58*c* protrudes from two ends in the longitudinal direction of the first protrusion 13 into the mating recess 12*b*. Moreover, a lower end vicinity of the outer side part 57*a* is sandwiched between the outer recessed groove parts 12*c* and is close to the curved part 51*b* in the inner wall 51 of the first shield 50. Note that the shield plate 56 is not necessarily attached to the first housing 11 by press fitting but may be integrated with the first housing 11 by overmolding or insert molding. Herein, for convenience of description, a case in which the shield plate 56 is retained by being press-fitted into the shield plate stowing slits 13*b* will be described.

Furthermore, the first connector 1 is placed on the surface of the first substrate with a first solder sheet (not shown) serving as a solder sheet applied to the mounting surface 1*b* side and is fixed and mounted on the surface of the first substrate by heating and melting the first solder sheet using a heating furnace or the like. Note that means for connecting the first shield 50, the first terminal 61, the first high-frequency terminal 71, the shield plate 56, and the like to the connection pad of the first substrate and the like is not necessarily limited to soldering, and may be, for example, conductive adhesive or the like. Moreover, even with soldering, soldering may be performed not by applying a solder sheet but by applying a solder paste, transferring cream solder, hot-dip galvanizing, jet soldering, or the like. Herein, for convenience of description, a case where a solder sheet is used will be described.

The first solder sheet contains: a pair of elongated strip shaped long side portions extending linearly and continuously in the longitudinal direction of the first connector 1; a plurality of elongated strip shaped short side portions extending linearly and continuously in the width direction of the first connector 1; and a plurality of rectangular short length portions in which a long side extends in the width direction of the first connector 1 and a short side extends in the longitudinal direction of the first connector 1. Note that two ends of each short side portion are preferably connected to the long side portions. Furthermore, the long side portion and short side portion do not necessarily have to extend continuously and may be intermittent, but will be described herein as extending continuously.

Furthermore, a pair of long side portions are provided on a lower surface of the flange part 54 corresponding to the long side parts 50*a* of the first shield 50, a pair of short side portions are provided on the lower surface of the flange part 54 corresponding to the short side part 50*b* of the first shield 50, and another pair of short side portions are provided on a lower surface of the tail part 57*e* of the shield plate 56. Furthermore, each short length portion is provided on a lower surface of the tail part 62 of each first terminal 61 and to a lower surface of the tail part 72 of each first high-frequency terminal 71.

When the first solder sheet provided in this manner is heated and melted and the first connector 1 is mounted on the surface of the first substrate, the bent part 52*a* and the flange part 54, which are continuously connected over the entire circumference to the lower end of the outer wall 52 that is continuous over the entire circumference of the first shield 50, are connected to the connection pads on the surface of the first substrate without a gap. Therefore, the strength of the first shield 50 connected to the connection pads on the surface of the first substrate is high, and consequently, the strength of the entire first connector 1 with an outer circumference surrounded by the first shield 50 is high. Furthermore, an electromagnetic shielding effect achieved by the first shield 50, which is connected without a gap to the connection pads on the surface of the first substrate, is very high, and the first connector 1 with an outer circumference surrounded by the first shield 50 is very effectively electromagnetically shielded. In particular, the smoothness of the lower surface of the flange part 54 is high. Thus, the strength of the first shield 50 connected to the connection pads on the surface of the first substrate can be made extremely high. Moreover, since no gap is created between the connection pads on the surface of the first substrate, the electromagnetic shielding effect can also be made extremely high.

Furthermore, as illustrated in FIG. 4(*b*), the mating recess 12*b* having an essentially rectangular planar shape has three peripheral sides demarcated by the long side part 50*a* and the short side part 50*b* of the first shield 50, and a remaining side is demarcated by the shield plate 56 such that the entire circumference is shielded. Thus, the first high-frequency terminal 71 positioned in the mating recess 12*b* is very effectively electromagnetically shielded. Therefore, the shielding effect is equivalent to that of a conventional coaxial connector, and high-frequency signals can be transmitted effectively. Note that the shield plate 56 is not a continuous plate-like member and has a plurality of gaps when viewed from the longitudinal direction of the first connector 1. Therefore, the electromagnetic shielding effect is lower than that of the long side part 50*a* and the short side part 50*b* of the first shield 50. Since the dimensions of each gap are small and an interval between the plurality of tail parts 57*e* connected to the connection pads on the surface of the first substrate by soldering is narrow, a sufficient electromagnetic shielding effect can be exhibited in practice. Furthermore, the lower end vicinity of the outer side part 57*a* is close to the lower end of the curved part 51*b* in the inner wall 51 of the first shield 50, and therefore, the shield plate 56 can cooperate with the first shield 50 to achieve a sufficient electromagnetic shielding effect.

Thus, the first connector 1 can transmit a high-frequency signal even though with a compact and low profile, because the strength and the electromagnetic shielding effect are high. For example, even if the dimensions in the longitudinal, width, and height directions of the first connector 1 are set to 3.3 [mm] or less, 2.3 [mm] or less, and 0.6 [mm] or less, the first high-frequency terminal 71 can transmit a high-frequency signal of approximately 60 [GHz].

Next, the configuration of the second connector 101 will be described.

Figure 6:
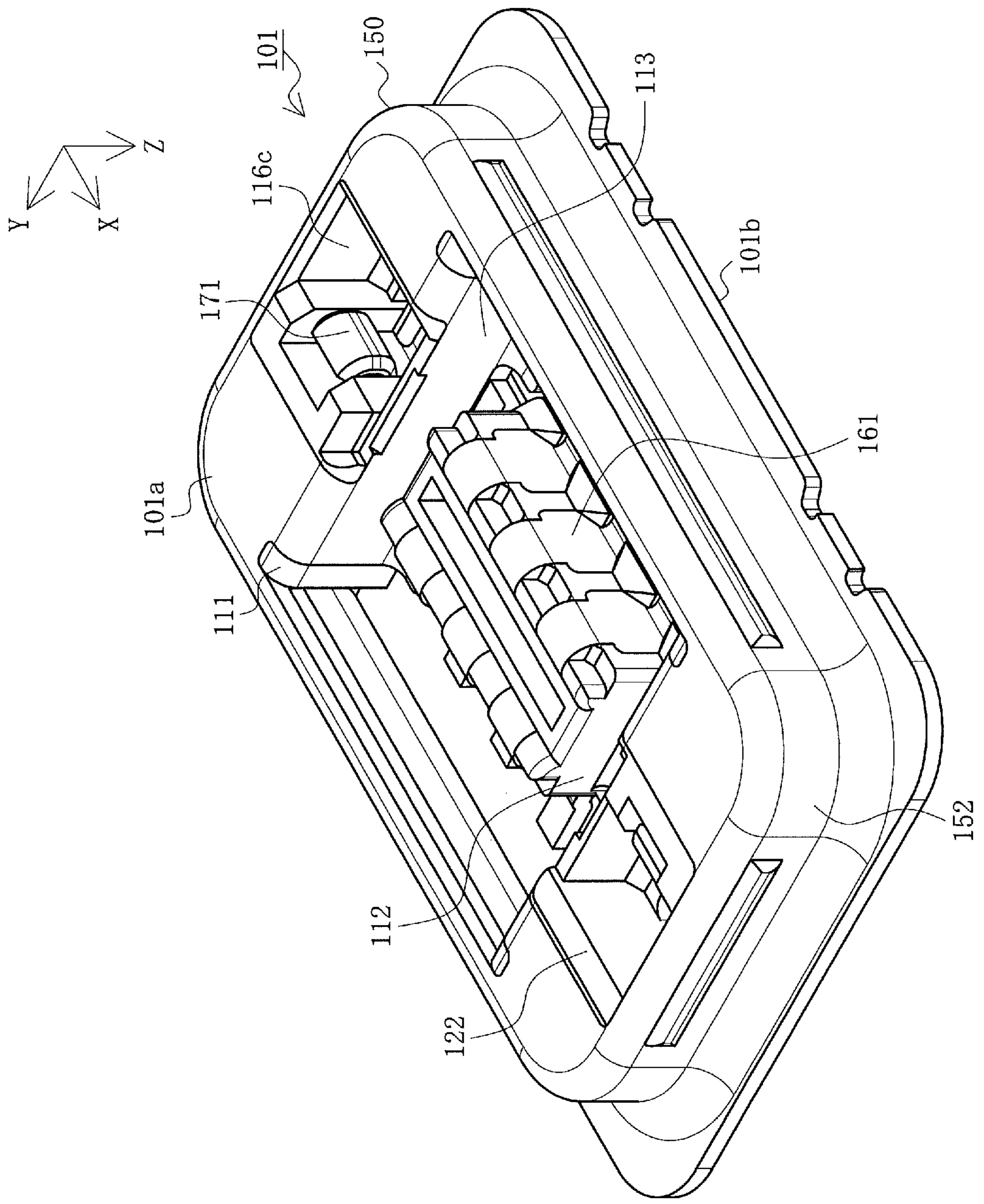
FIG. 6 is a perspective view of the second connector according to Embodiment 1.
Figure 7:
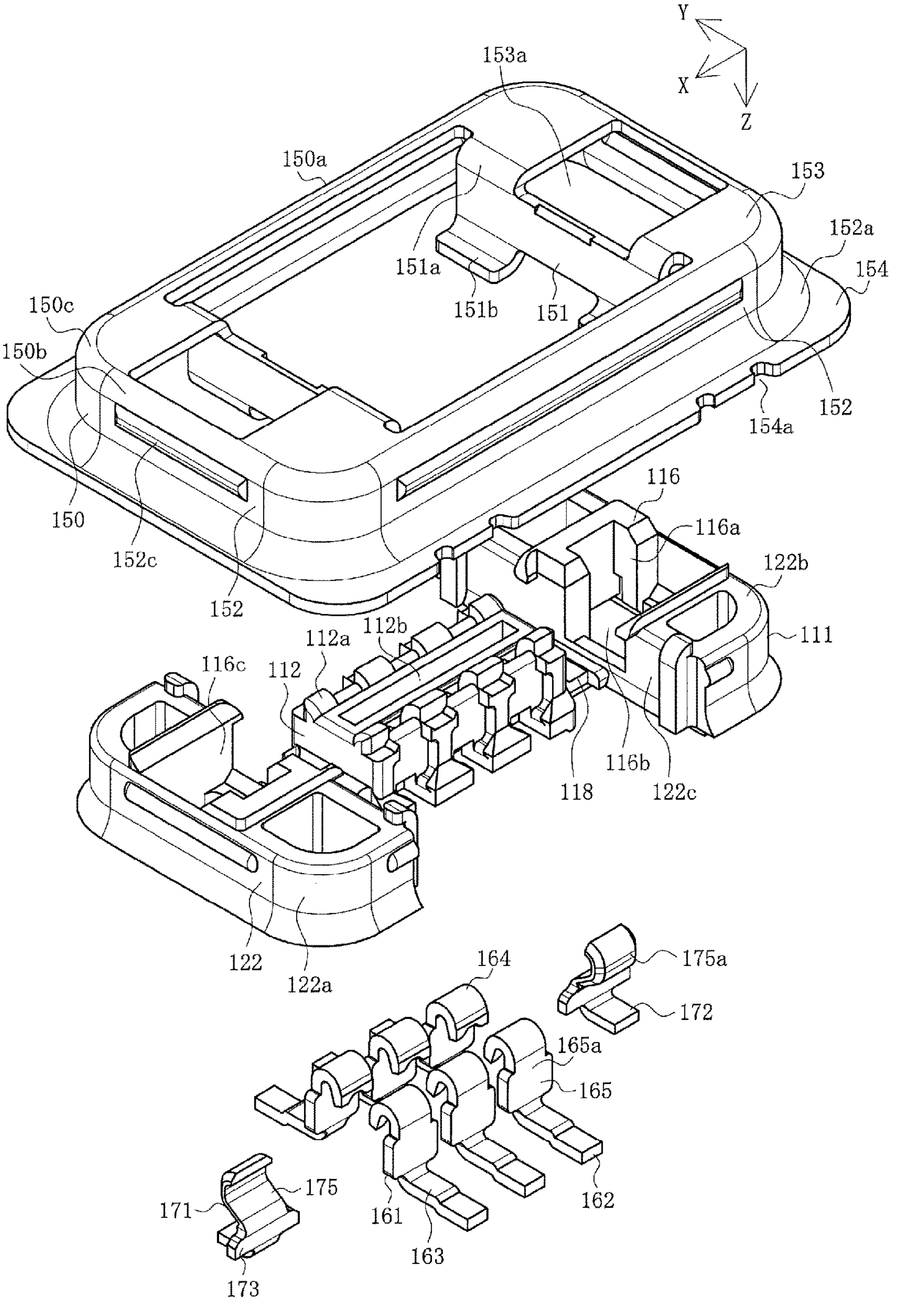
FIG. 7 is an exploded view illustrating the second connector according to Embodiment 1.
Figure 8:
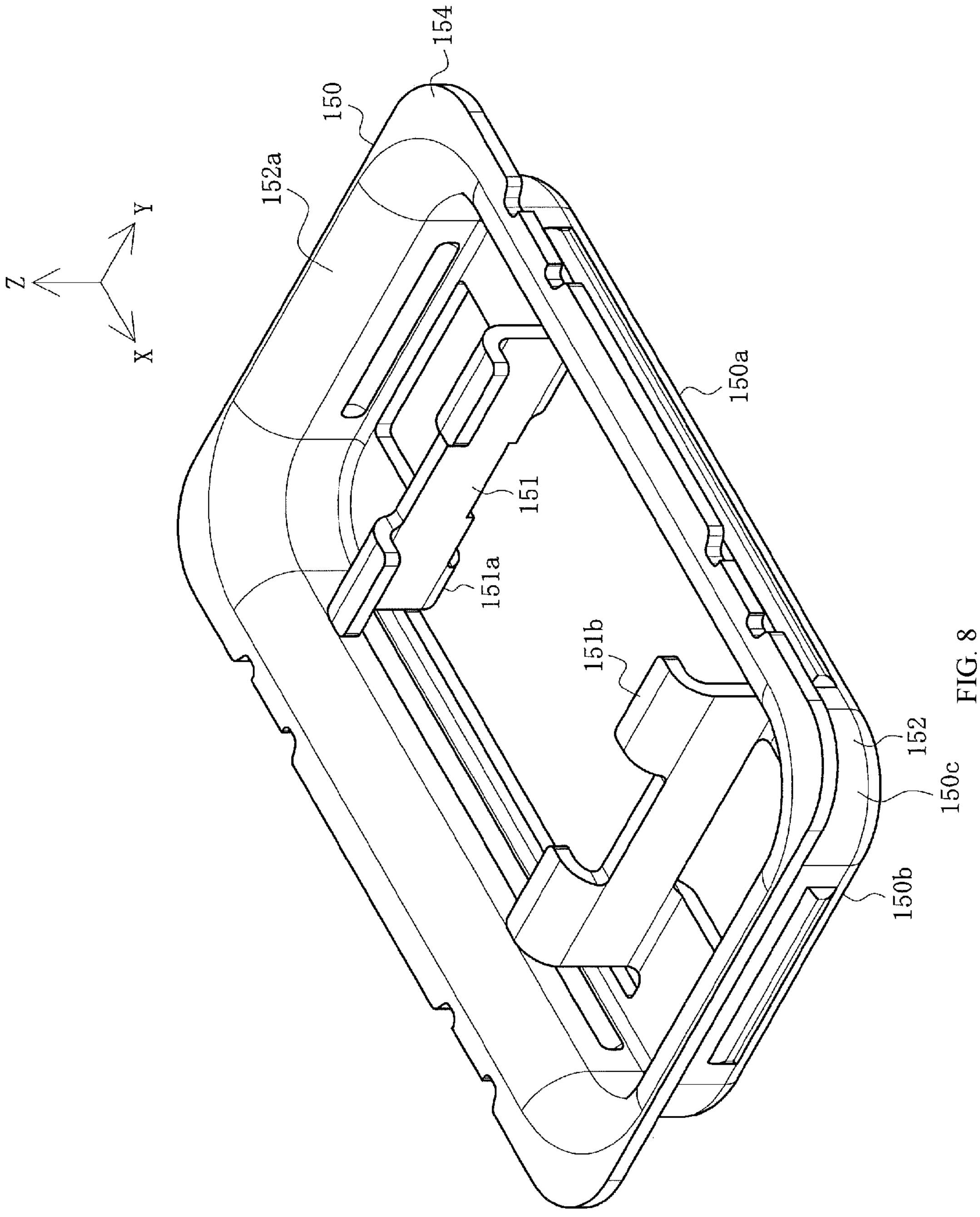
FIG. 8 is a perspective view of a second shield according to Embodiment 1.
Figure 9:
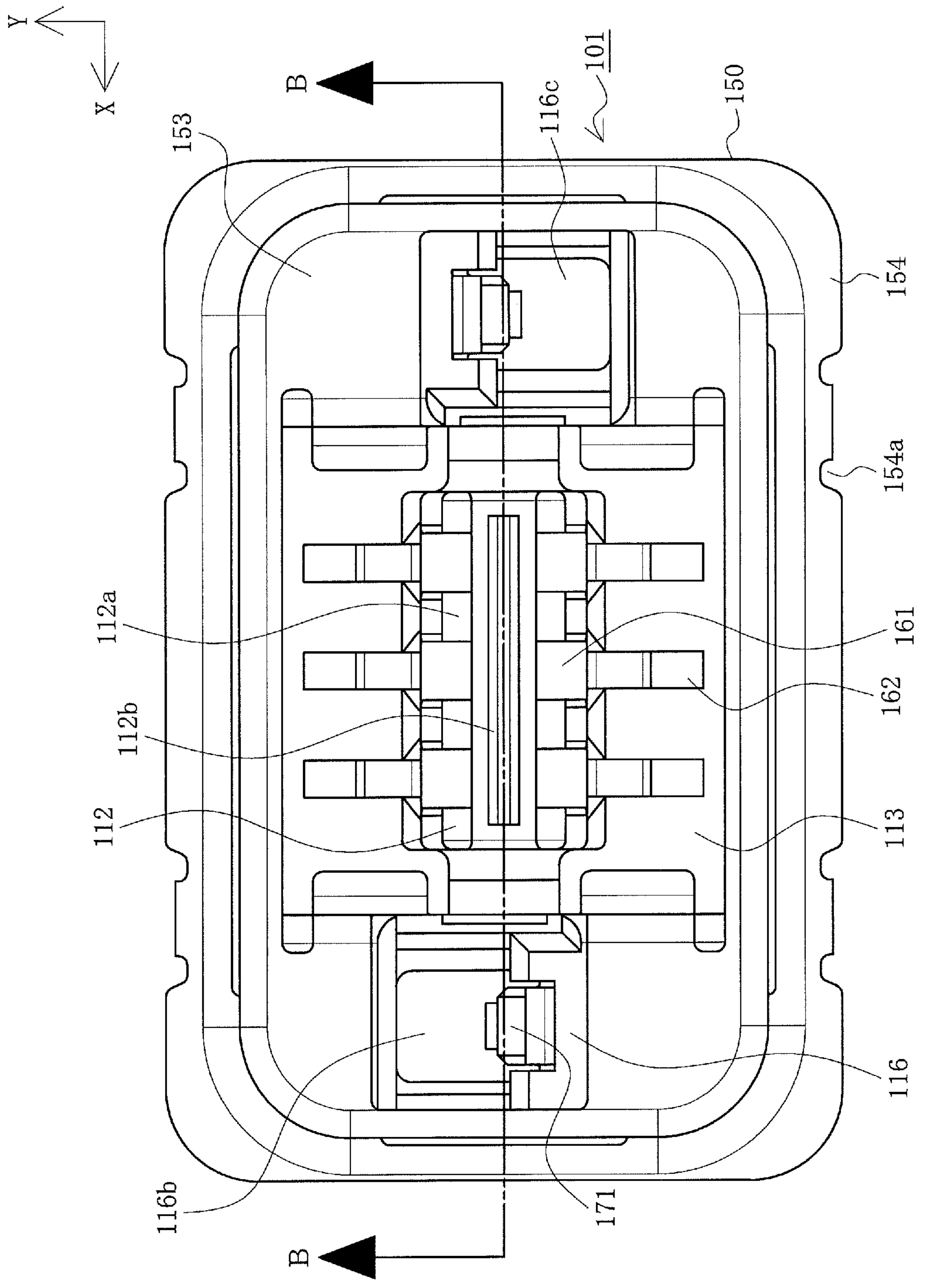
FIG. 9 is an upper surface view illustrating the second connector according to Embodiment 1.
Figure 10:
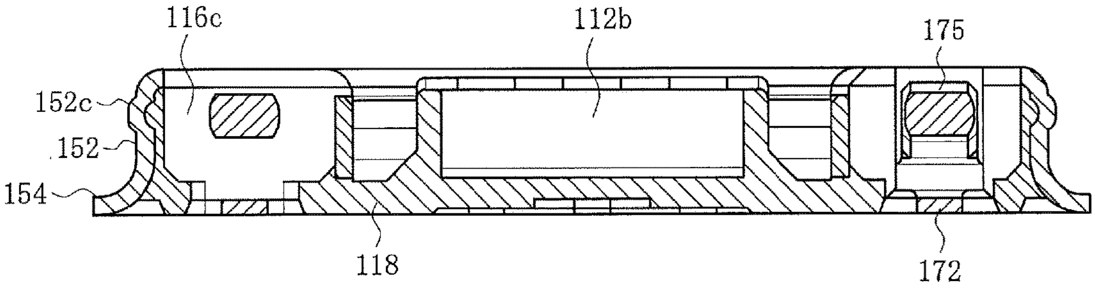
FIG. 10 is views describing a portion viewed along arrow B-B of the second connector according to Embodiment 1, where (a) is a side cross-sectional view of the portion viewed along arrow B-B in FIG. 9, and (b) is a perspective view illustrating a cross section of the portion viewed along arrow B-B in FIG. 9.
Figure 10:
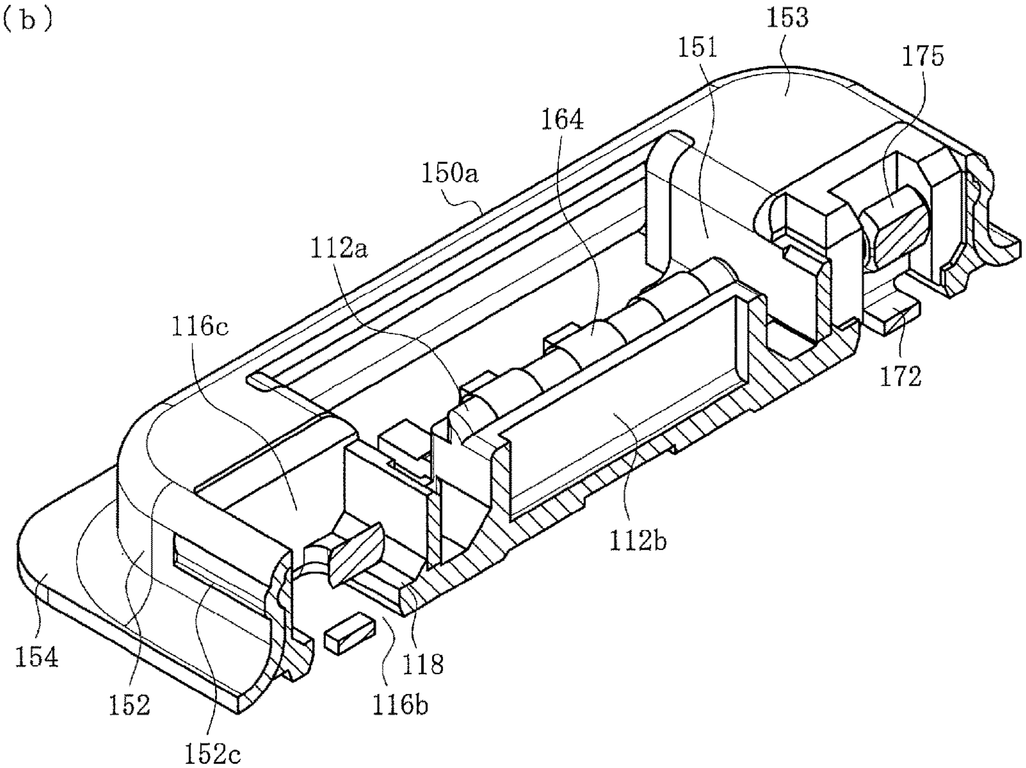
Figure 11:
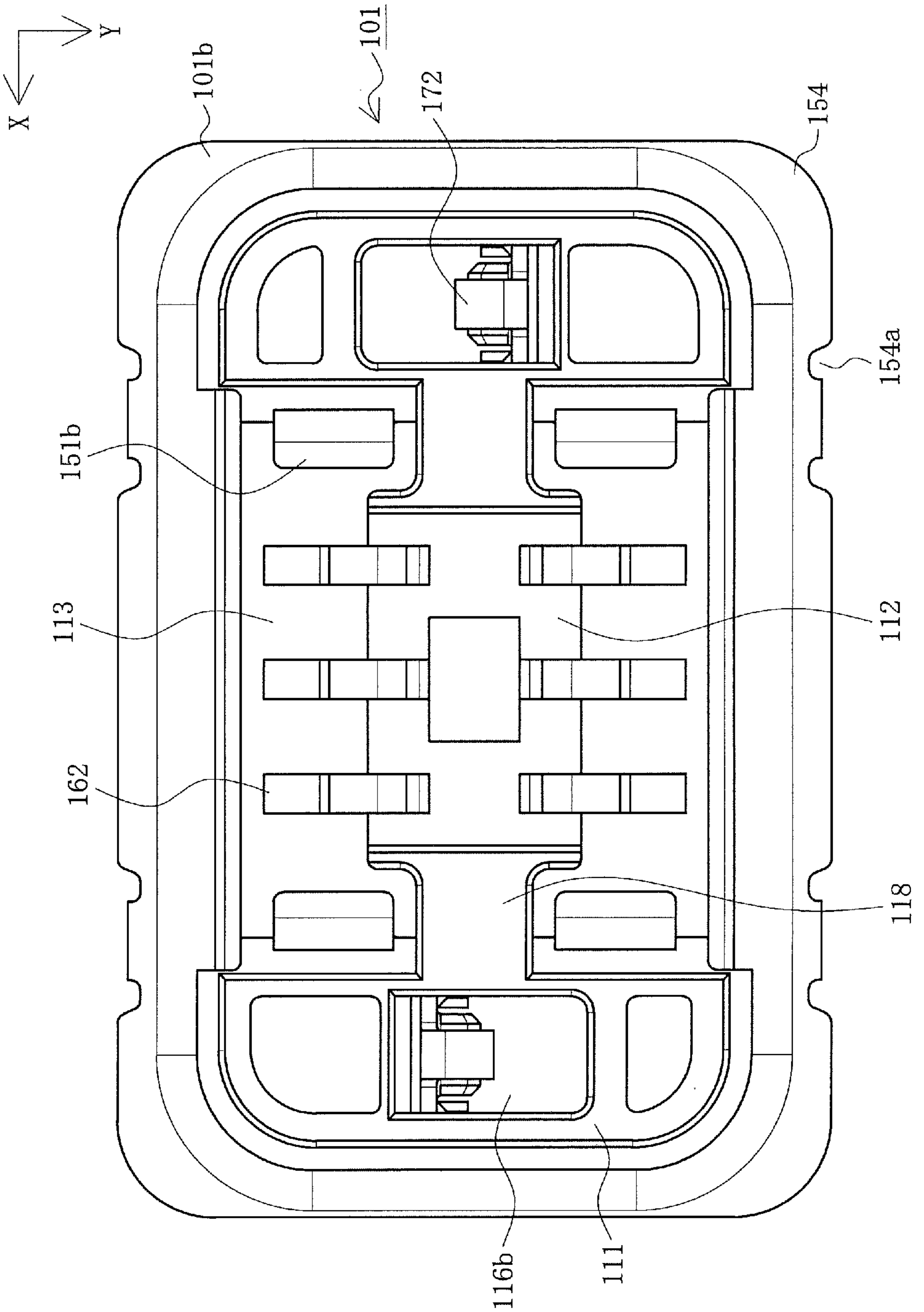
FIG. 11 is a lower surface view illustrating the second connector according to Embodiment 1.

FIG. 6 is a perspective view of the second connector according to Embodiment 1; FIG. 7 is an exploded view of the second connector according to Embodiment 1; FIG. 8 is a perspective view of the second shield according to Embodiment 1; FIG. 9 is an upper surface view of the second connector according to Embodiment 1; FIG. 10 is a portion viewed along arrow B-B of the second connector according to the Embodiment 1; and FIG. 11 is a lower surface view of the second connector according to Embodiment 1. Note that in FIG. 10, (a) is a side cross-sectional view of the portion viewed along arrow B-B in FIG. 9, and (b) is a perspective view illustrating a cross section of the portion viewed along arrow B-B in FIG. 9.

The second connector 101 according to the present embodiment has: a second shield 150 as a second outer side shield, which is a plug shield formed by punching, drawing, or the like on a conductive metal plate; and a second housing 111 as a second connector main body integrally formed by an insulating material such as a synthetic resin or the like. The second housing 111 has: a flat bottom plate 118; a second protrusion 112 serving as a protrusion protruding upwardly from an upper surface of the bottom plate 118 in a center in a longitudinal direction of the second connector 101; and a pair of protruding end parts 122 protruding upwardly from the upper surface of the bottom plate 118 at two ends in the longitudinal direction (X-axis direction) of the second connector 101. The second protrusion 112 is narrower than the protruding end part 122 and is positioned more on an inner side in a width direction (Y-axis direction) of the second connector 101 than two ends of the protruding end part 122.

The second protrusion 112 is an essentially rectangular member extending in the longitudinal direction of the second connector 101. An elongated groove shaped center slit 112*b* recessed downwardly from an upper surface is formed in a center in the width direction, and portions on two sides on the left and right of the center slit 112*b* are terminal supporting walls 112*a* supporting the second terminal 161 serving as a mating terminal. The second terminal 161 is disposed on an outer side surface of the terminal supporting wall 112*a* at a pitch and number corresponding to the first terminal 61. In other words, a plurality of the second terminals 161 are disposed along each terminal supporting wall 112*a* to form a pair of parallel terminal group rows (mating terminal group rows).

Each protruding end part 122 contains: an outer wall surface 122*a* that faces an outer side in the longitudinal direction and two sides in the width direction of the second connector 101; an upper surface 122*b* that faces the mating surface 101*a* side of the second connector 101; and an inner wall surface 122*c* that faces an inner side in the longitudinal direction of the second connector 101. Note that each of the protruding end parts 122 is separated from two ends in the longitudinal direction of the second protrusion 112. Furthermore, a second high-frequency terminal supporting part 116 serving as a supporting part is formed on each protruding end part 122. The second high-frequency terminal supporting part 116 has a second high-frequency terminal stowing grooves 116*a* serving as a high-frequency terminal stowing groove extending in the vertical direction and has an essentially U-shaped shape when viewed from above. The second high-frequency terminal supporting parts 116 are disposed such that openings of the respective second high-frequency terminal stowing grooves 116*a* face opposite directions and, as illustrated in FIG. 9, are disposed so as to be point-symmetrical with regard to a center of the second connector 101 when viewed from above, in other words, in a plan view, and so as to be separated from the center of the second connector 101 in the width direction and deflected to an outer side in the width direction. Furthermore, a second high-frequency terminal 171 serving as a high-frequency terminal is stowed in the second high-frequency terminal stowing grooves 116*a*. Furthermore, a second high-frequency terminal stowing opening 116*b* serving as an opening penetrating the bottom plate 118 in the plate thickness direction is formed below and in front of the second high-frequency terminal stowing grooves 116*a*. Furthermore, on each of the protruding end parts 122, a first high-frequency terminal stowing recess 116*c*, serving as a mating terminal stowing recess opened in an upper surface 122*b* from the second high-frequency terminal stowing opening 116*b* to the upper surface 122*b*, is formed in front of the second high-frequency terminal stowing grooves 116*a*.

The second shield 150 is a member integrally formed by punching, drawing, or the like on a conductive metal plate and is an essentially rectangular frame shaped member in plan view, which surrounds an entire circumference of the second housing 111. Furthermore, the second shield 150 contains: a pair of long side parts 150*a* extending linearly in the longitudinal direction of the second connector 101; a pair of short side parts 150*b* extending linearly in the width direction of the second connector 101; and four corner parts 150*c* bent approximately 90 degrees connecting one end of the long side part 150*a* and one end of the short side part 150*b*.

Furthermore, the second shield 150 contains: an outer wall 152; an inner wall 151 serving as a second inner second inner side shield; and an upper wall 153. Furthermore, the outer wall 152 is a continuous wall over an entire circumference. Furthermore, the upper wall 153 is connected to an upper end of the outer wall 152 at each of the short side parts 150*b*, the corner parts 150*c* at two ends of the short side parts 150*b*, and in the vicinity of two ends of each of the long side parts 150*a* and is formed so as to cover at least a portion, preferably a majority, of the upper surface 122*b* of the protruding end part 122. Note that the first high-frequency terminal stowing opening 153*a* is formed in the upper wall 153, which serves as an opening corresponding to the first high-frequency terminal stowing recess 116*c*. Furthermore, the inner wall 151 extends downwardly with an upper end thereof connected to an inner side end in the longitudinal direction of the second connector 101 on the upper wall 153 and is formed so as to cover at least a portion, preferably essentially entirely, of the inner wall surface 122*c* of the protruding end part 122. Note that an upper end of the inner wall 151 has a bent upper wall connecting part 151*a* that is connected to the upper wall 153, and a lower end of the inner wall 151 has a tail part 151*b* serving as a substrate connecting part that is bent such that a tip end faces to an inner side in the longitudinal direction of the second connector 101. The tail part 151*b* is parallel to the surface of the second substrate and is a portion connected by soldering or the like to the connection pad on the surface. The connection pad is typically connected to a ground line. Furthermore, a space with a circumference surrounded by the outer wall 152 corresponding to the pair of long side parts 150*a* and the pair of inner walls 151 is a second recess 113 into which the first protrusion 13 of the first connector 1 is inserted and stowed.

A flange part 154 serving as a flat part is connected to the lower end of the outer wall 152 through the bent part 152*a* bent at an angle of approximately 90 degrees. The bent part 152*a* and the flange part 154 are connected to the lower end of the outer wall 152 in a continuous manner around the entire circumference. Note that in the example illustrated in the drawings, a small notch 154*a* is formed in a plurality of locations on the flange part 154, but the notch 154*a* can be omitted as appropriate.

The flange part 154 functions as a substrate connecting part, a lower surface of which is parallel to the surface of the second substrate and is a portion connected by soldering or the like to the connection pad on the surface. The connection pad is typically connected to a ground line. Furthermore, the outer wall 152, in addition to being a continuous wall over the entire circumference itself, is connected to a member where a lower end thereof is continuous as with the flange part 154, which is a member extending in a direction orthogonal to the outer wall 152 in the cross section as illustrated in FIG. 10(*a*). Therefore, the outer wall 152 is relatively rigid and resistant to deformation. In the present embodiment, an example is described where the flange part 154 is connected to the lower end of the outer wall 152 continuously over the entire circumference, but the flange part 154 may be connected only to a portion if relatively high rigidity is not required.

Furthermore, the outer wall 152 corresponding to the long side part 150*a*, and the short side part 150*b* has the outwardly protruding engaging protrusion 152*c*. The engaging protrusion 152*c* is a portion that engages with the engaging recess 51*c* formed on the inner wall 51 of the first shield 50 provided by the first connector 1 when the first connector 1 and the second connector 101 are mated with each other and extends linearly in the longitudinal or width direction of the second connector 101.

Note that the second shield 150 is integrated with the second housing 111 by overmolding or insert molding. In other words, the second housing 111 is molded by filling a cavity of a mold in which the second shield 150 is internally set in advance, with an insulating material such as synthetic resin or the like, and is integrally connected to the second shield 150 at the protruding end part 122.

The second terminal 161 is a member integrally formed by punching, bending, or the like on a conductive metal plate, and has: a retained part 163; a tail part 162 serving as a substrate connecting part connected to a first end of the retained part 163; a lower side connecting part 165 connected to a second end of the retained part 163 and extending in the vertical direction (Z-axis direction); and an upper side connecting part 164 connected to an upper end of the lower side connecting part 165. The second terminals 161 may be integrated with the second housing 111 by over-molding or insert molding That is, the second housing 111 is molded by filling a cavity of a mold in which the second terminals 161 are set in advance with an insulating material such as a synthetic resin.

As a result, the second terminal 161 is integrally attached to the terminal supporting wall 112*a* such that at least a portion thereof is embedded in the terminal supporting wall 112*a* of the second protrusion 112 in the second housing 111, and a portion of the upper side connecting part 164 and a surface of the lower side connecting part 165 are exposed on an upper surface and outer side surface of the terminal supporting wall 112*a*. Note that the surface of the lower side connecting part 165 functions as a contacting part 165*a* and contacts the first terminal 61 provided by the first connector 1. Furthermore, the tail part 162 extends to an outer side in the width direction of the second housing 111 from the terminal supporting wall 112*a* and is connected by soldering or the like to a connection pad connected to a conductive trace of the second substrate. The tail part 162 is disposed at a position overlapping the tail part 151*b* of the inner wall 151 when viewed from the longitudinal direction (X-axis direction) of the second connector 101. Note that the conductive trace may be a power line that supplies power but is typically a signal line. Furthermore, the signal line is described assuming that the signal line does not transmit a high-frequency signal but rather transmits a signal of normal frequency (for example, frequency less than 10 [GHz]), which is lower in frequency than high-frequency signals.

Furthermore, the second terminal 161 is not necessarily integrated with the second housing 111 by overmolding or insert molding but may be attached to the second housing 111 by press fitting or the like. Herein, for convenience of description, a case of integrating with the second housing 111 by overmolding or insert molding will be described.

The second high-frequency terminal 171 is a member integrally formed by punching, bending, or the like on a conductive metal plate, and has: a retained part 173; a tail part 172 serving as a substrate connecting part connected to a lower end of the retained part 173; and an upper side connecting part 175 connected to an upper end of the retained part 173.

Furthermore, the retained part 173 extends in the vertical direction and is a portion that is press-fitted and retained in the second high-frequency terminal stowing grooves 116*a*. As described above, the second high-frequency terminal supporting parts 116 are disposed such that the openings of the respective second high-frequency terminal stowing grooves 116*a* face opposite directions, and therefore, the second high-frequency terminals 171 retained in the second high-frequency terminal stowing grooves 116*a* by the retained part 173 are also in a posture facing mutually opposite directions. Note that the second high-frequency terminal 171 is not necessarily attached to the second housing 111 by press fitting but may be integrated with the second housing 111 by overmolding or insert molding. Herein, for convenience of description, a case in which the retained part 173 is pressed into and retained by the second high-frequency terminal stowing grooves 116*a* will be described.

The tail part 172 is bent and connected to the retained part 173, extends in a left-right direction (Y-axis direction), in other words, toward the center in the width direction of the second connector 101, and is connected to the connection pad connected to a conductive trace of the second substrate by soldering or the like. Note that the aforementioned conductive traces are signal lines, which are typically described as transmitting high-frequency signals of high frequency (for example, frequency of 10 [GHz] or higher), such as RF signals.

Furthermore, the upper side connecting part 175 is bent in an approximate S-shape when viewed from the longitudinal direction of the second connector 101, and a portion bent so as to bulge out toward the center in the width direction of the second connector 101 functions as a contacting part 175*a*. The contacting part 175*a* is a portion that contacts a first high-frequency terminal 71 provided by the first connector 1.

The second high-frequency terminal 171 is press-fitted from a mounting surface 101*b* side into the second high-frequency terminal stowing grooves 116*a* of the second high-frequency terminal supporting part 116 positioned on the protruding end part 122 and is fixed to the second housing 111 based on the retained part 173 being sandwiched from two sides by inner side surfaces of the second high-frequency terminal stowing grooves 116*a*. In this state, in other words, in a state in which the second high-frequency terminals 171 are installed in the second housing 111, the contacting parts 175*a* of the pair of second high-frequency terminals 171 mutually face in opposite directions.

Note that in the example illustrated in the drawings, the second high-frequency terminal 171 is formed to have the same dimensions and shape as the first high-frequency terminal 71. Therefore, the first high-frequency terminal 71 can be used as the second high-frequency terminal 171.

Furthermore, the second connector 101 is placed on the surface of the second substrate with a second solder sheet (not shown) serving as a solder sheet applied to the mounting surface 101*b* side and is fixed and mounted on the surface of the second substrate by heating and melting the second solder sheet using a heating furnace or the like. Note that means for connecting the second shield 150, the second terminal 161, the second high-frequency terminal 171, and the like to the connection pad of the second substrate and the like is not necessarily limited to soldering and may be, for example, conductive adhesive or the like. Moreover, even with soldering, soldering may be performed not by applying a solder sheet but by applying a solder paste, transferring cream solder, hot-dip galvanizing, jet soldering, or the like. Herein, for convenience of description, a case where a second solder sheet is used will be described.

The second solder sheet contains: a pair of elongated strip shaped long side portions extending linearly and continuously in the longitudinal direction of the second connector 101; a plurality of elongated strip shaped short side portions extending linearly and continuously in the width direction of the second connector 101; and a plurality of rectangular short length portions in which a long side extends in the width direction of the second connector 101 and a short side extends in the longitudinal direction of the second connector 101. Note that two ends of each short side portion are preferably connected to the long side portions. Furthermore, the long side portion and short side portion do not necessarily have to extend continuously and may be intermittent but will be described herein as extending continuously.

Furthermore, a pair of long side portions are provided on a lower surface of the flange part 154 corresponding to the long side parts 150*a* of the second shield 150, a pair of short side portions are provided on the lower surface of the flange part 154 corresponding to the short side part 150*b* of the second shield 150, and another pair of short side portions are provided on a lower surface of the tail part 151*b* of the inner wall 151. Furthermore, each short length portion is provided on a lower surface of the tail part 162 of each second terminal 161 and to a lower surface of the tail part 172 of each second high-frequency terminal 171.

When the second solder sheet provided in this manner is heated and melted, and the second connector 101 is mounted on the surface of the second substrate, the bent part 152*a* and the flange part 154, which are continuously connected over an entire circumference to the lower end of the outer wall 152 that is continuous over the entire circumference in the second shield 150, are connected to the connection pads on the surface of the second substrate without a gap. Therefore, the strength of the second shield 150 connected to the connection pads on the surface of the second substrate is high, and consequently, the strength of the entire second connector 101 with an outer circumference surrounded by the second shield 150 is high. Furthermore, an electromagnetic shielding effect exerted by the second shield 150, which is connected without a gap to the connection pads on the surface of the second substrate, is very high, and the second connector 101 with an outer circumference surrounded by the second shield 150 is very effectively electromagnetically shielded. In particular, the smoothness of the lower surface of the flange part 154 is high. Thus, the strength of the second shield 150 connected to the connection pads on the surface of the second substrate can be made extremely high. Moreover, since no gap is created between the connection pads on the surface of the second substrate, the electromagnetic shielding effect can also be made extremely high.

Furthermore, each of the protruding end parts 122 at two ends of the second connector 101 in the longitudinal direction are covered by the outer wall 152 of the second shield 150 on the outer wall surface 122*a* facing an outer side in the longitudinal direction and two sides in the width direction of the second connector 101, the upper surface 122*b* facing the mating surface 101*a* of the second connector 101 is covered by the upper wall 153 of the second shield 150, and the inner wall surface 122*c* facing an inner side in the longitudinal direction of the second connector 101 is covered by the inner wall 151 of the second shield 150. Therefore, an entire circumference is shielded, and the second high-frequency terminal 171 supported by the second high-frequency terminal supporting part 116 formed on the protruding end part 122 is very effectively electromagnetically shielded.

Thus, the second connector 101 can transmit a high-frequency signal even though with a compact and low profile, because the strength and the electromagnetic shielding effect are high. For example, even if the dimensions in the longitudinal, width, and height directions of the second connector 101 are set to 2.9 [mm] or less, 1.9 [mm] or less, and 0.6 [mm] or less, the second high-frequency terminal 171 can transmit a high-frequency signal of approximately 60 [GHz].

Subsequently, the operation of mating together the first connector 1 and the second connector 101 with the above configuration will be described.

Figure 12:
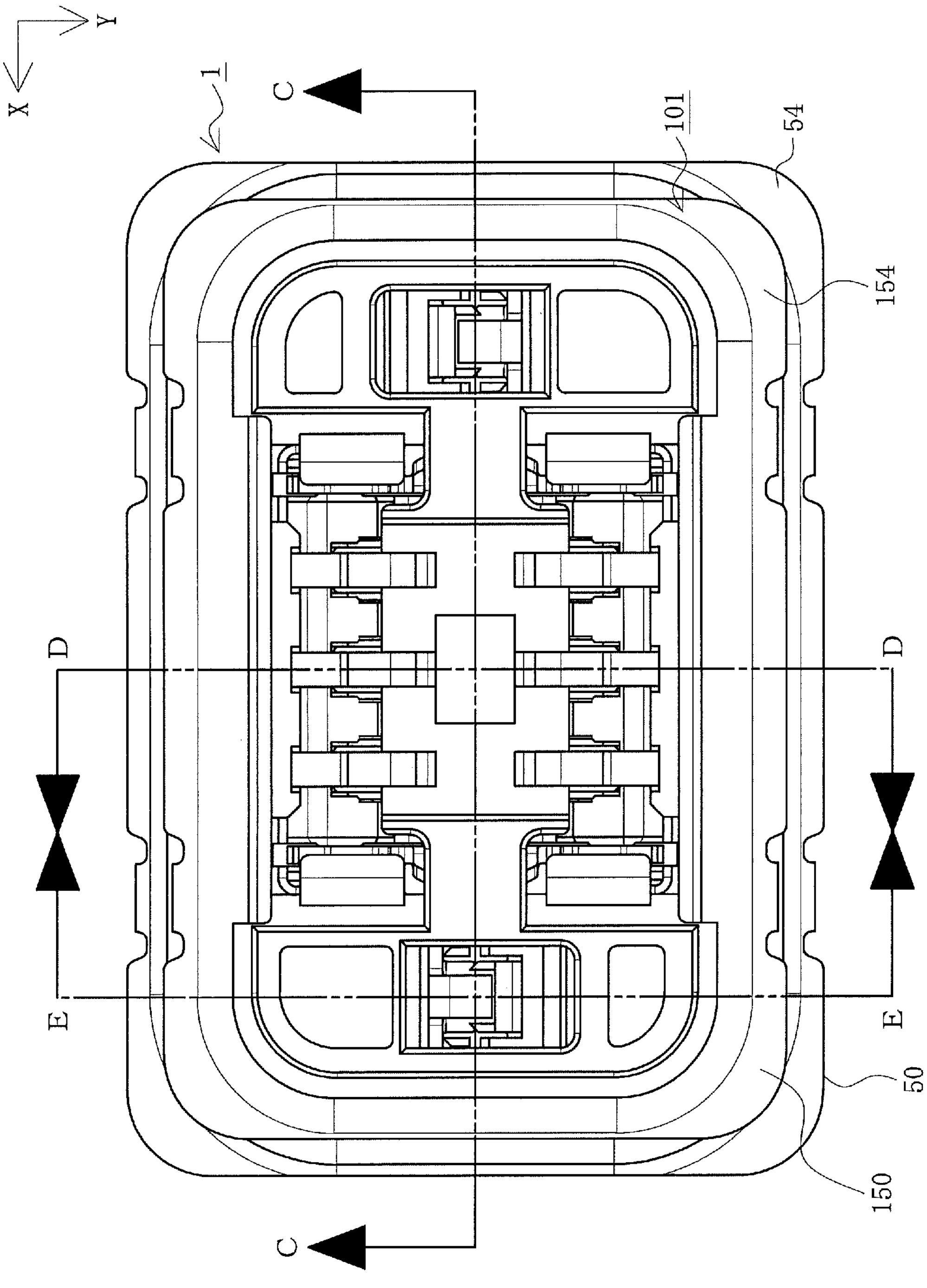
FIG. 12 is a plan view of a state in which the first connector and second connector according to Embodiment 1 are mated.
Figure 13:
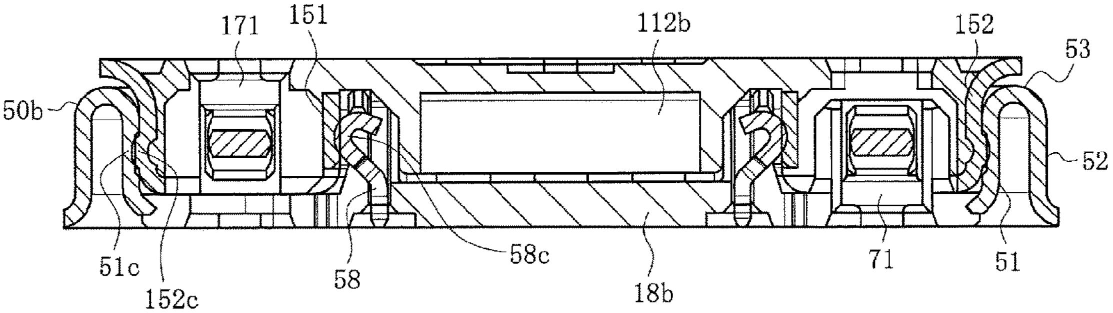
FIG. 13 is a cross-sectional view of the state in which the first connector and the second connector according to Embodiment 1 are mated, where (a) is a cross-sectional view of a portion viewed along arrow C-C in FIG. 12, (b) is a cross-sectional view of a portion viewed along arrow D-D in FIG. 12, and (c) is a cross-sectional view of a portion viewed along arrow E-E in FIG. 12.
Figure 13:
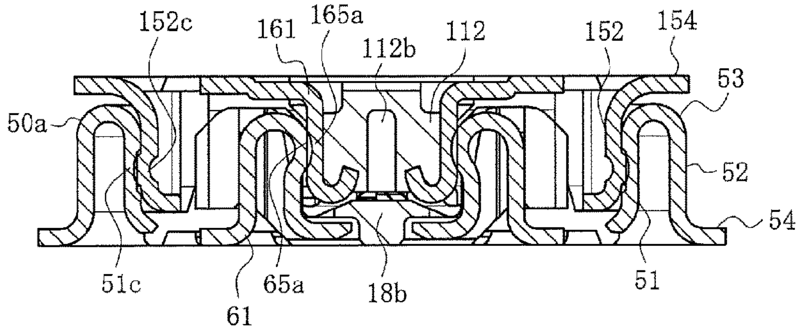
Figure 13:
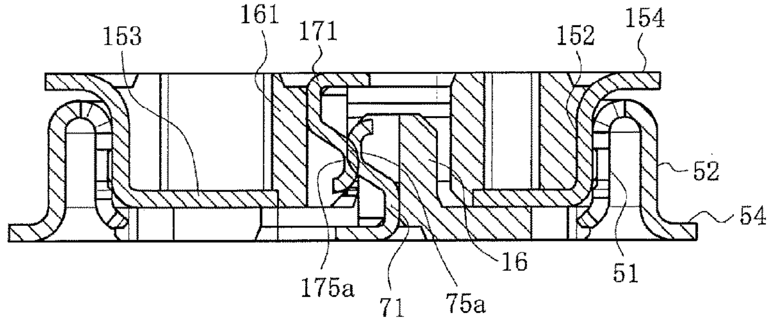

FIG. 12 is a plan view of a state in which the first connector and the second connector according to Embodiment 1 are mated, and FIG. 13 is a cross-sectional view of a state in which the first connector and the second connector according to Embodiment 1 are mated. Note that in FIG. 13, (a) is a cross-sectional view of a portion viewed along arrow C-C in FIG. 12, (b) is a cross-sectional view of a portion viewed along arrow D-D in FIG. 12, and (c) is a cross-sectional view of a portion viewed along arrow E-E in FIG. 12.

Herein, the first connector 1 is surface mounted to the first substrate by connecting the tail part 62 of the first terminal 61, the tail part 72 of the first high-frequency terminal 71, the tail part 57*e* of the shield plate 56, and the bent part 52*a* and the flange part 54, which are continuously connected over the entire circumference to the lower end of the outer wall 52 that is continuous over the entire circumference of the first shield 50, to a connection pad connected to a conductive trace of the first substrate (not shown) by soldering. Furthermore, a conductive trace connected to the connection pad to which the tail part 72 of the first high-frequency terminal 71 is connected is a signal line and transmits a high-frequency signal, like an antenna line connected to an antenna. A conductive trace connected to the connection pad to which the tail part 57*e* of the shield plate 56 and the bent part 52*a* and the flange part 54 of the first shield 50 is a ground line. Moreover, a conductive trace connected to the connection pad to which the tail part 62 of the first terminal 61 is connected is a signal line, which transmits a signal of lower frequency than the high-frequency signal.

Similarly, the second connector 101 is surface mounted to the second substrate by connecting the tail part 162 of the second terminal 161, the tail part 172 of the second high-frequency terminal 171, the tail part 151*b* of the inner wall 151 on the second shield 150, and the bent part 152*a* and the flange part 154, which are continuously connected over the entire circumference to the lower end of the outer wall 152 that is connected over the entire circumference in the second shield 150, to a connection pad connected to a conductive trace of the second substrate (not shown) by soldering. Furthermore, a conductive trace connected to the connection pad to which the tail part 172 of the second high-frequency terminal 171 is connected is a signal line and transmits a high-frequency signal, like an antenna line connected to an antenna. A conductive trace connected to the connection pad to which the tail part 151*b* of the inner wall 151 of the second shield 150 and the bent part 152*a* and the flange part 154 of the second shield 150 is a ground line. Moreover, a conductive trace connected to the connection pad to which the tail part 162 of the second terminal 161 is connected is a signal line, which transmits a signal of lower frequency than the high-frequency signal.

First, an operator places the mating surface 1*a* of the first connector 1 and the mating surface 101*a* of the second connector 101 so as to face each other as illustrated in FIG. 1 and when the position of the first protrusion 13 of the first connector 1 matches the position of the second recess 113 of the second connector 101 and the position of the protruding end part 122 of the second connector 101 matches the position of the mating recess 12*b* corresponding to the first connector 1, positioning of the first connector 1 and the second connector 101 is completed.

In this state, when the first connector 1 and/or the second connector 101 are moved in a direction approaching a mating side, in other words, in a mating direction, the second shield 150 of the second connector 101 is inserted into the stowing part 50*d* of the first shield 50 of the first connector 1, the first protrusion 13 of the first connector 1 is inserted into the second recess 113 of the second connector 101, and the protruding end part 122 of the second connector 101 is inserted into the mating recess 12*b* of the first connector 1. Note that the coupling part 53 of the first shield 50 is present on the mating surface 1*a* of the first connector 1 so as to surround a circumference thereof, and the outer wall 152 and the upper wall 153 of the second shield 150 are present on the mating surface 101*a* of the second connector 101. Therefore, the mating surface 1*a* of the first connector 1 and the mating surface 101*a* of the second connector 101 will not be damaged or broken even when coming into contact with each other. Thus, as illustrated in FIG. 12, when the mating of the first connector 1 and the second connector 101 is completed, the first terminal 61 and the second terminal 161 conduct electricity, and the first high-frequency terminal 71 and the second high-frequency terminal 171 achieve an electrically conductive state.

Specifically, the second protrusion 112 of the second housing 111 is inserted into the inner recessed groove part 12*a* of the first housing 11 and as illustrated in FIG. 13(*b*), the contacting part 65*a* of the first terminal 61 protruding from the inner side surface of the first protrusion 13 into the inner recessed groove part 12*a* contacts the contacting part 165*a* of the second terminal 161 exposed on the outer side surface of the terminal supporting wall 112*a* of the second protrusion 112. At this time, the contacting part 65*a* of the first terminal 61 is elastically displaceable in the width direction of the first connector 1 and the second connector 101 because the bent upper side connecting part 65 itself is elastically deformable. Furthermore, the contacting part 165*a* of the second terminal 161 is elastically displaceable toward a center in the width direction of the first connector 1 and the second connector 101 because an interval between the pair of terminal supporting walls 112*a* integrated with the lower side connecting part 165 is elastically contractible due to the presence of the center slit 112*b* formed therebetween. As a result, the contacting part 65*a* of the first terminal 61 and the contacting part 165*a* of the second terminal 161 corresponding to each other maintain contact and do not separate even when subjected to shock or vibration, and thus can maintain a stable state of electrical conduction. Note that the first terminal 61 and the second terminal 161 corresponding to each other are in mutual contact only one point, a so-called single contact point, such that no unintended stubs or divided circuits are formed in the signal transmission line from the tail part 62 of the first terminal 61 to the tail part 162 of the second terminal 161. Therefore, the impedance of the transmission line can be stabilized and favorable SI (signal-to-interference) characteristics can be achieved.

Furthermore, the first high-frequency terminal supporting part 16 positioned in the mating recess 12*b* is inserted into the first high-frequency terminal stowing recess 116*c* of the protruding end part 122, and the contacting part 75*a* of the first high-frequency terminal 71 and the contacting part 175*a* of the second high-frequency terminal 171 contact each other as illustrated in FIG. 13(*c*). At this time, the contacting parts 75*a* and 175*a* of the first high-frequency terminal 71 and the second high-frequency terminal 171 are elastically displaceable in the width direction of the first connector 1 and the second connector 101 because the bent upper side connecting parts 75 and 175 are themselves elastically deformable. As a result, the contacting part 75*a* of the first high-frequency terminal 71 and the contacting part 175*a* of the second high-frequency terminal 171 corresponding to each other maintain contact and do not separate even when subjected to shock or vibration, and thus can maintain a stable state of electrical conduction. Note that the first high-frequency terminal 71 and the second high-frequency terminal 171 corresponding to each other contact each other at only one point, a so-called single contact point, such that no unintended stubs or divided circuits are formed in the signal transmission line from the tail part 72 of the first high-frequency terminal 71 to the tail part 172 of the second high-frequency terminal 171. Therefore, the impedance of the transmission line can be stabilized and favorable SI characteristics can be achieved.

Furthermore, when the protruding end part 122 is inserted into the mating recess 12*b*, the contacting part 58*c* of the center part 58 of the shield plate 56 protrudes into the mating recess 12*b* and contacts the inner wall 151 of the second shield 150 covering the inner wall surface 122*c* of the protruding end part 122 as illustrated in FIG. 13(*a*). The center part 58 includes one bent part 58*b* and two inclined leg parts 58*a* extending so as to branch from a lower end of the bent part 58*b*, and an outer surface of the bent part 58*b* is the contacting part 58*c*. Therefore, the distance from the contacting part 58*c*, which functions as a spring, to a lower end of the inclined leg part 58*a*, in other words a spring length, is long, and thus the contacting part 58*c* can be flexibly and elastically displaced in the longitudinal direction of the first connector 1 and the second connector 101. As a result, the contacting part 58*c* of the shield plate 56 and the inner wall 151 of the second shield 150 maintain contact and do not separate even when subjected to shock or vibration, and thus a stable equipotential state can be maintained and a high shielding effect can be demonstrated.

Furthermore, the spring length of the center part 58 is long, and therefore, even if the contacting part 58*c* is displaced, no force is applied to the tail part 57*e*, such that a connection between the tail part 57*e* and the connection pad is securely maintained. Therefore, the shielding effect of the shield plate 56 does not deteriorate. Note that although a narrow gap is present between the outer side part 57*a* of the shield plate 56 and the inner wall 51 of the first shield 50, when the second shield 150 is inserted into the stowing part 50*d* of the first shield 50, the outer wall 152 at the long side part 150*a* of the second shield 150 enters the gap, such that the gap becomes substantially narrower, and the electromagnetic shielding effect exerted by the shield plate 56 is improved.

In this manner, the first high-frequency terminal 71 and second high-frequency terminal 171, which are in contact with each other, have entire circumferences that are continuously surrounded by the inner wall 51, outer wall 52, and shield plate 56 of the first shield 50 and the inner wall 151 and outer wall 152 of the second shield 150, and moreover, are doubly surrounded, thereby being extremely effectively shielded. Therefore, the impedance of the transmission line of a signal from the tail part 72 of the first high-frequency terminal 71 to the tail part 172 of the second high-frequency terminal 171 is stabilized, and favorable SI characteristics can be achieved.

Furthermore, when the second shield 150 of the second connector 101 is inserted into the stowing part 50*d* of the first shield 50 of the first connector 1, the outer surface of the outer wall 152 of the second shield 150 contacts or approaches the inner surface of the inner wall 51 of the first shield 50 and as illustrated in FIGS. 13(*a*) and 13(*b*), the engaging protrusion 152*c* formed on the outer wall 152 of the second shield 150 and the engaging recess 51*c* formed on the inner wall 51 of the first shield 50 are engaged. Note that the linear part 51*a* of the inner wall 51, in which the engaging recess 51*c* is formed, is separated from another portion by the slit part 53*a* at two ends thereof and is relatively flexible; a state of engagement with the engaging protrusion 152*c* of the outer wall 152 of the second shield 150 can be reliably maintained. As a result, the first shield 50 and the second shield 150 become locked and release of the mating state between the first connector 1 and the second connector 101 is prevented. Furthermore, the first shield 50 and the second shield 150 are in contact with each other and are electrically conductive and at equipotential, and therefore, electromagnetic shielding is improved.

Furthermore, before the first connector 1 and the second connector 101 are mated, the bent end part 51*d* of the first shield 50 is connected to the connecting end 18*c* of the bottom plate 18 formed in the first housing 11 but during mating, the inner wall 51 of the first shield 50 is pressed to an outer side by the outer wall 152 of the second shield 150. As a result, the bent end part 51*d* formed on the inner wall 51 may be separated from the connecting end 18*c* of the bottom plate 18. Separation allows the inner wall 51 of the first shield 50 to follow the second shield 150 and maintain a stable contact state.

Thus, in present embodiment, the connector pair contains: the first connector 1 provided with the first housing 11, the first terminal 61 attached to the first housing 11, the first high-frequency terminal 71 attached to the first housing 11, and the first shield 50 enclosing the entire circumference of the first housing 11; and the second connector 101 that mates with the first connector 1, which is provided with the second housing 111, the second terminal 161 attached to the second housing 111, the second high-frequency terminal 171 attached to the second housing 111, and the second shield 150 enclosing the entire circumference of the second housing 111. The first connector 1 is further provided with the shield plate 56 attached to the first housing 11 and extending in the width direction of the first connector 1 between the first terminal 61 and the first high-frequency terminal 71, and the second connector 101 is further provided with the inner wall 151 attached to the second housing 111 and extending in the width direction of the second connector 101 between the second terminal 161 and the second high-frequency terminal 171. When the first connector 1 and the second connector 101 are mated, the first shield 50 and the second shield 150 contact each other and conduct electricity, and the shield plate 56 and the inner wall 151 contact each other and conduct electricity.

As a result, the first terminal 61 and the first high-frequency terminal 71 and the second terminal 161 and the second high-frequency terminal 171 can be attached to the compact and low-profile first connector 1 and second connector 101, which are mounted on the first substrate and the second substrate. Thus, high strength can be exhibited, a high shielding effect can be achieved, and reliability is improved, even with the compact and low profile.

Furthermore, in the present embodiment, the first connector 1 is provided with the first housing 11, the first terminal 61 attached to the first housing 11, the first high-frequency terminal 71 attached to the first housing 11, and the first shield 50 enclosing an entire circumference of the first housing 11, mates with the second connector 101, and is further provided with the shield plate 56 attached to the first housing 11 and extending in the width direction of the first connector 1 between the first terminal 61 and the first high-frequency terminal 71. The tail part 62 of the first terminal 61 is visible from the mating surface 1*a* side of the first connector 1, and the tail part 57*e* of the shield plate 56 is not visible from the mating surface 1*a* side.

Thus, the first connector 1 is further provided with the shield plate 56 attached to the first housing 11, and the shield plate 56 extends in the width direction of the first connector 1 between the first terminal 61 and the first high-frequency terminal 71, such that the first high-frequency terminal 71 can be effectively shielded.

Furthermore, the tail part 57*e* of the shield plate 56 is not visible from the mating surface 1*a* side, whereas the tail part 62 of the first terminal 61 is visible from the mating surface 1*a* side of the first connector 1. First, the tail part 57*e* of the shield plate 56 is a portion connected to a connection pad connected to a ground line together with the first shield 50. Therefore, an impediment does not occur even when a connecting member such as solder or the like for connecting the tail part 57*e* to the connection pad contacts or fuses with a connecting member for connecting the adjacent first shield 50 to the connection pad. On the other hand, the tail parts 62 of the first terminals 61 disposed adjacent to each other at a narrow pitch such as 0.35 [mm], for example, are portions connected to connection pads connected to signal lines that transmit separate signals. Thus, if a connecting member such as solder or the like for connecting the tail parts 62 to the connection pads contacts or fuses with a connecting member for connecting the tail parts 62 of other adjacent first terminals 61, a serious impediment will occur. Therefore, by making the tail part 62 of the first terminal 61 visible from the mating surface 1*a* side of the first connector 1, it is possible to confirm whether or not a connecting member such as solder or the like for connecting the tail part 62 contacts or fuses with a connecting member for connecting the tail part 62 of another first terminal 61 adjacent to the first terminal 61. Thus, the occurrence of a situation in which a serious impediment occurs can be prevented.

Furthermore, the first shield 50 contains the outer wall 52, the inner wall 51 essentially parallel to the outer wall 52 inside the outer wall 52, a coupling part 53 connecting an upper end of the outer wall 52 to an upper end of the inner wall 51, an outwardly extending flange part 54 connected to a lower end of the outer wall 52, and a stowing part 50*d* with a circumference surrounded by the inner wall 51, which stows the second connector 101. The inner wall 51 contains the linear part 51*a* and the curved part 51*b*, and the linear part 51*a* is deformable in a direction of approaching or separating from the outer wall 52. Therefore, the first shield 50 can reliably maintain contact with the second shield 150 of the second connector 101 and will not be damaged or broken.

Furthermore, the outer wall 52 and the flange part 54 are continuous over an entire circumference of the first housing 11. Therefore, the strength and shielding effectiveness of the first shield 50 are improved, and consequently, the strength and shielding effectiveness of the first connector 1 are improved.

Furthermore, the linear part 51*a* and the curved part 51*b* of the inner wall 51 are separated by the slit part 53*a*, and the first housing 11 is connected to the linear part 51*a*. Therefore, an external force received by the first shield 50 is prevented from being transmitted to the first housing 11, and the first housing 11 will not be damaged or broken.

Furthermore, in the present embodiment, the second connector 101 is provided with the second housing 111, the second terminal 161 attached to the second housing 111, the second high-frequency terminal 171 attached to the second housing 111, and the second shield 150 enclosing an entire circumference of the second housing 111, mates with the first connector 1, and is further provided with the inner wall 151 attached to the second housing 111 and extending in the width direction of the second connector 101 between the second terminal 161 and the second high-frequency terminal 171. The tail part 151*b* of the inner wall 151 is disposed at a position overlapping with the tail part 162 of the second terminal 161, viewed from the longitudinal direction of the second connector 101.

Thus, the second connector 101 is further provided with the inner wall 151 attached to the second housing 111, and the inner wall 151 extends in the width direction of the second connector 101 between the second terminal 161 and the second high-frequency terminal 171, such that the second high-frequency terminal 171 can be effectively shielded.

Furthermore, the tail part 151*b* of the inner wall 151 is disposed at a position overlapping the tail part 162 of the second terminal 161 when viewed from the longitudinal direction of the second connector 101. Therefore, an entire signal transmission path from the second terminal 161 to a signal line connected to a connection pad to which the tail part 162 is connected is shielded from the second high-frequency terminal 171 by an entire ground potential transmission path from the inner wall 151 to a ground line connected to a connection pad to which the tail part 151*b* is connected. Thus, the second high-frequency terminal 171 can be effectively shielded from an influence of a signal transmitted by the second terminal 161.

Furthermore, the second shield 150 contains the outer wall 152, the upper wall 153, and the outwardly extending flange part 154 connected to a lower end of the outer wall 152. The second housing 111 contains the protruding end part 122 disposed at two ends in the longitudinal direction of the second connector 101, and the upper wall 153 covers at least a portion of the upper surface 122*b* of the protruding end part 122. Therefore, an external force received by the second shield 150 is prevented from being transmitted to the second housing 111, and the second housing 111 will not be damaged or broken.

Furthermore, the outer wall 152 and the flange part 154 are continuous over an entire circumference of the second housing 111. Therefore, the strength and shielding effectiveness of the second shield 150 are improved, and consequently, the strength and shielding effectiveness of the second connector 101 are improved.

Furthermore, the inner wall 151 is connected to the upper wall 153, the second high frequency terminal 171 is attached to the protruding end part 122, and the entire circumference of the second high-frequency terminal 171 is surrounded by the outer wall 152 and the inner wall 151. Therefore, the second high-frequency terminal 171 can be effectively shielded.

Next, Embodiment 2 will be described below. Note that, for portions having the same structure as that of Embodiment 1, descriptions thereof are omitted by giving the same reference numerals thereto. Moreover, descriptions of the same operations and effects as those of Embodiment 1 will be omitted.

Figure 14:
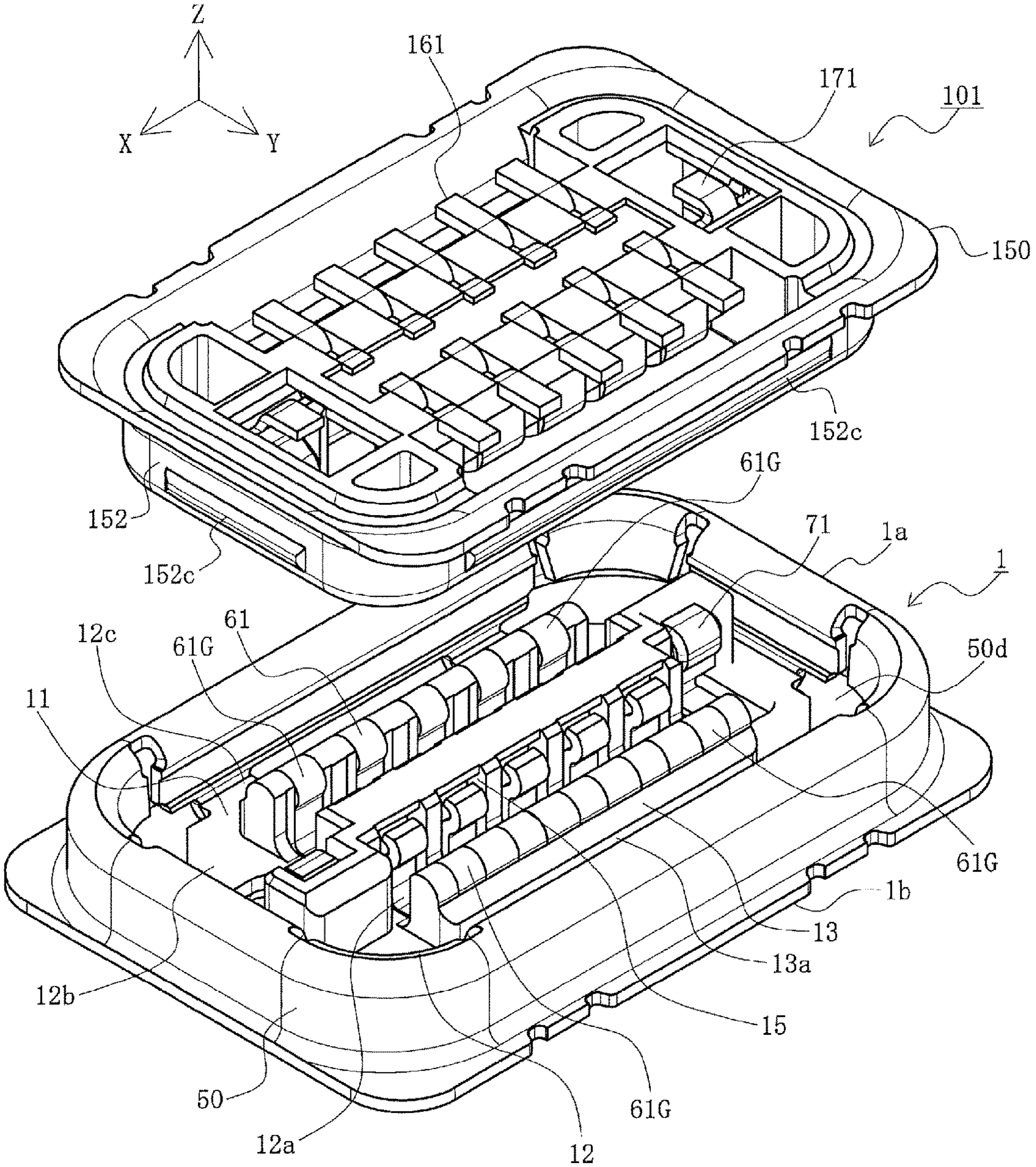
FIG. 14 is a perspective view of a first connector and a second connector according to Embodiment 2 prior to mating.
Figure 15:
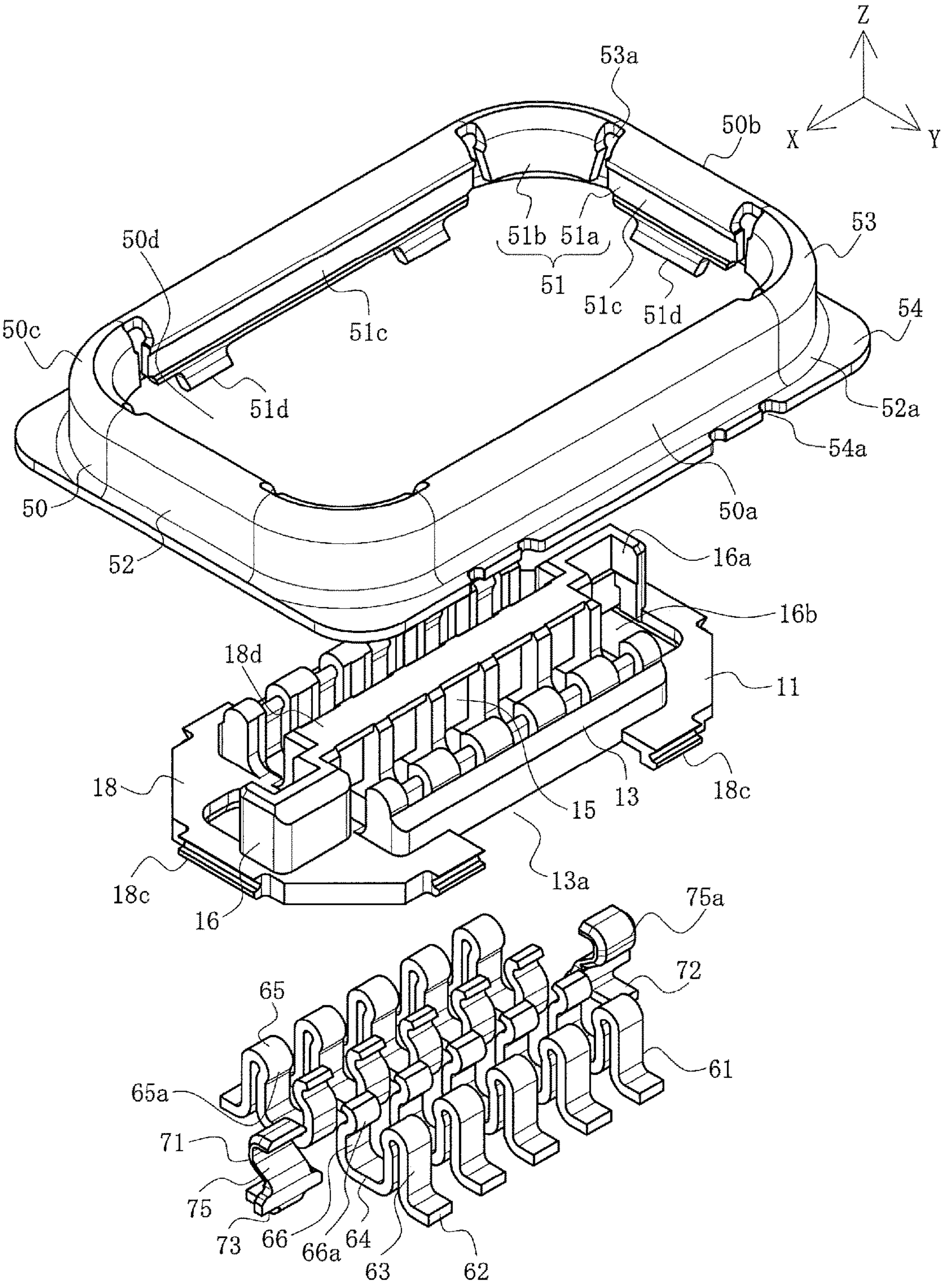
FIG. 15 is an exploded view illustrating the first connector according to Embodiment 2.
Figure 16:
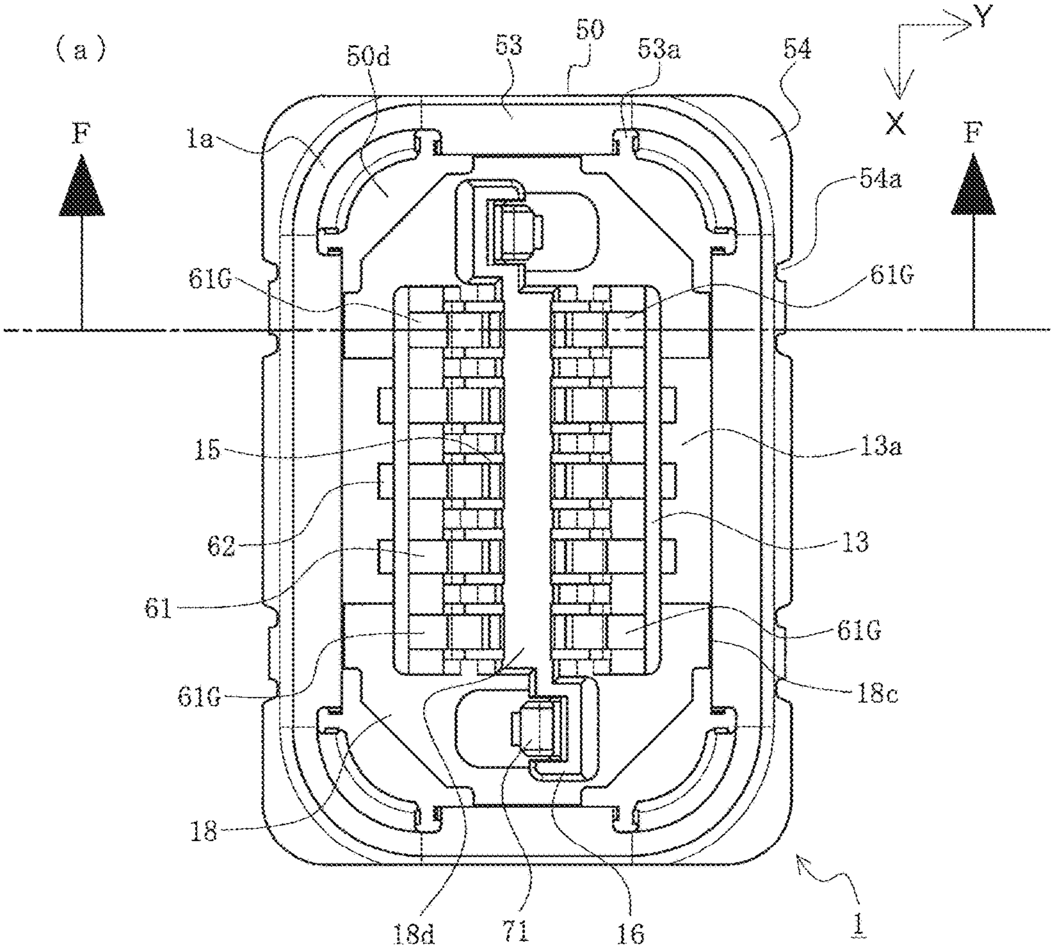
FIG. 16 is two views of the first connector according to Embodiment 2, where (a) is an upper surface view and (b) is a lateral cross-sectional view of a portion viewed along arrows F-F arrow in (a).
Figure 16:
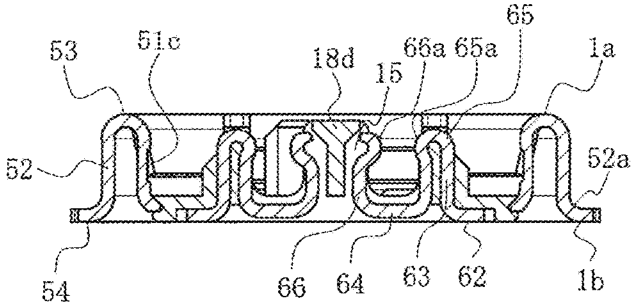
Figure 17:
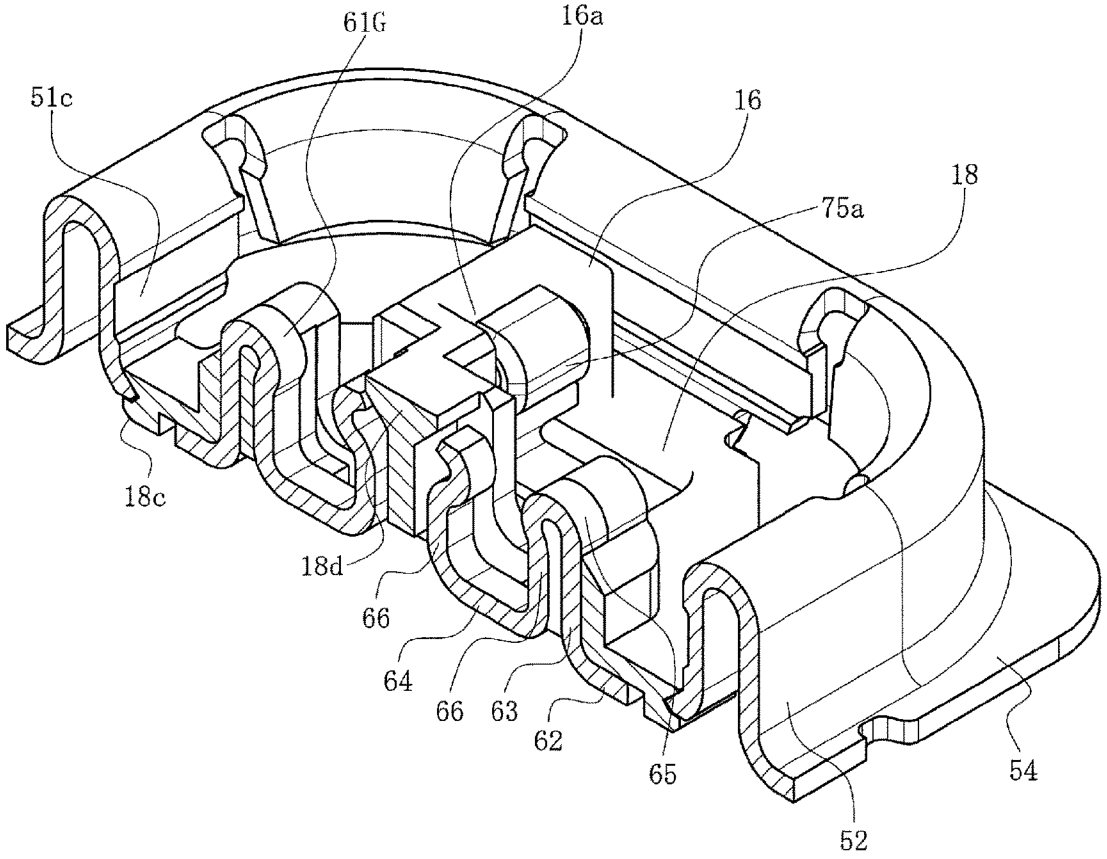
FIG. 17 is a perspective view illustrating the portion viewed along arrows F-F of the first connector according to Embodiment 2.
Figure 18:
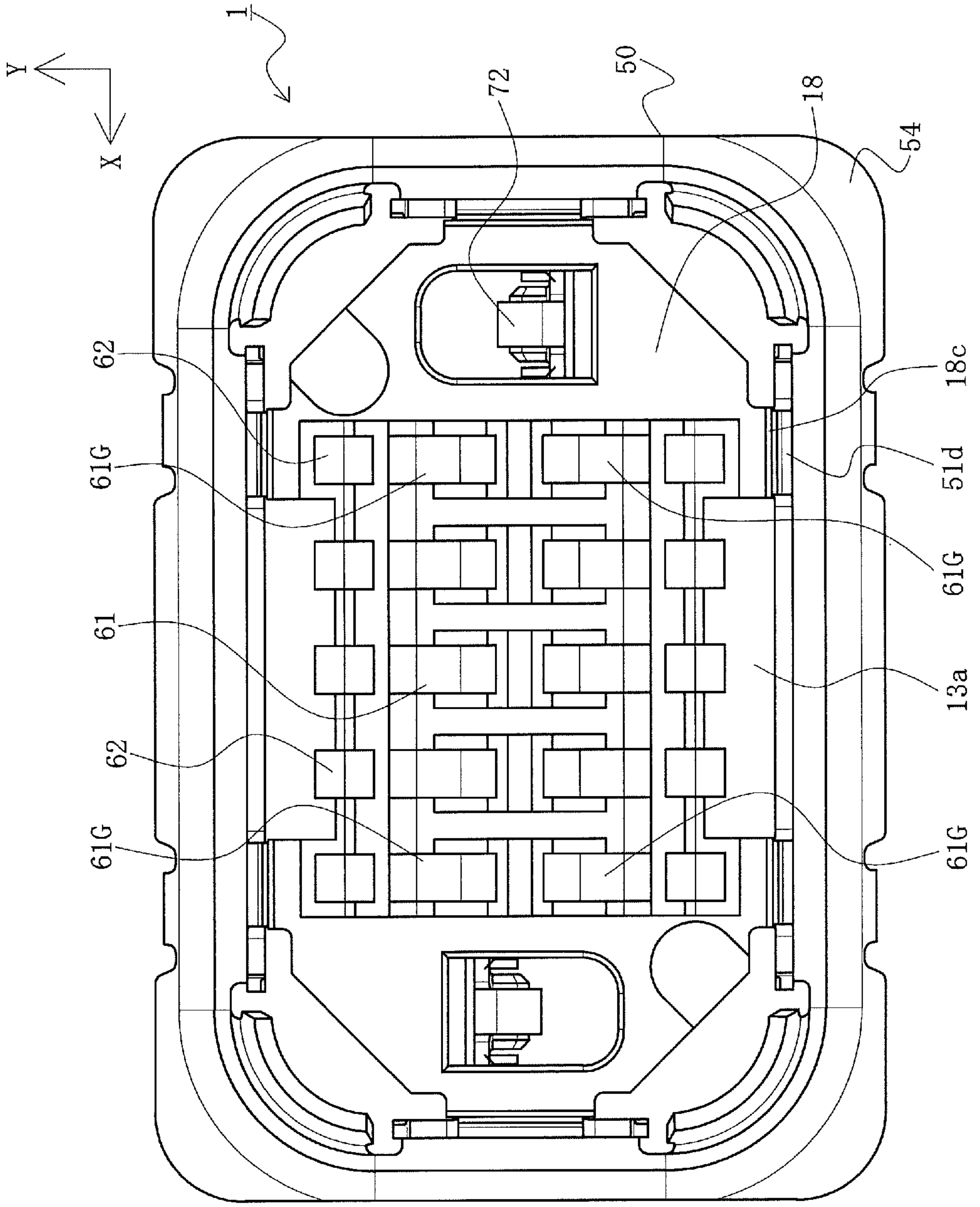
FIG. 18 is a lower surface view illustrating the first connector according to Embodiment 2.
Figure 19:
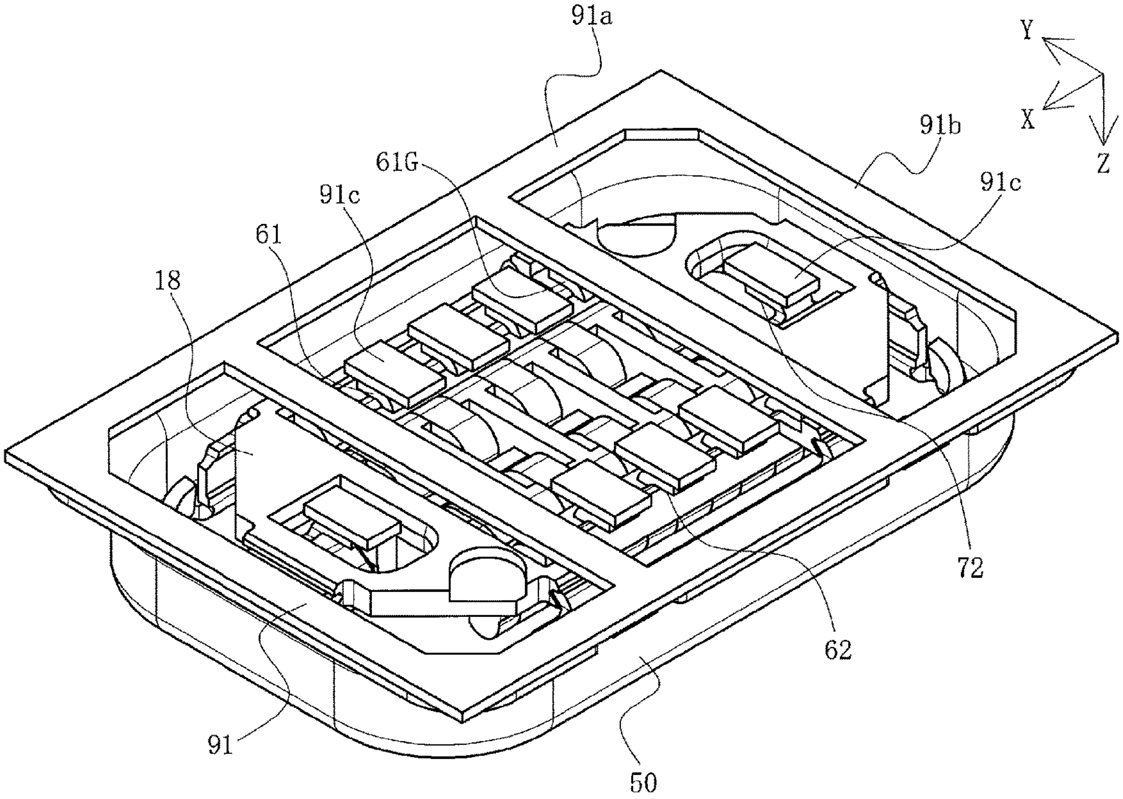
FIG. 19 is a perspective view illustrated a solder sheet provided on each substrate connecting part of the first connector according to Embodiment 2.

FIG. 14 is a perspective view prior to mating a first connector and a second connector according to Embodiment 2; FIG. 15 is an exploded view of the first connector according to Embodiment 2; FIG. 16 is two views of the first connector according to Embodiment 2; FIG. 17 is a perspective view illustrating a portion viewed along arrow F-F of the first connector according to Embodiment 2; FIG. 18 is a lower surface view of the first connector according to Embodiment 2; and FIG. 19 is a perspective view illustrating a solder sheet provided to each substrate connecting part of the first connector according to Embodiment 2. In FIG. 16, (a) is an upper surface view and (b) is a cross-sectional view of the portion viewed along arrow F-F arrow in (a).

In the aforementioned Embodiment 1, a case was described in which the first terminal 61 of the first connector 1 is not integrated with the first housing 11 by overmolding or insert molding but is retained by press-fitting the retained part 63 into the first terminal stowing cavity 15 formed in the first protrusion 13. In the present embodiment, a case will be described in which the first terminal 61 of the first connector 1 is integrated with the first protrusion 13 of the first housing 11 by overmolding or insert molding.

Furthermore, the shape of the first housing 11 is partly changed accordingly. In the aforementioned Embodiment 1, a portion between the first protrusions 13 on the bottom plate 18 is the thick wall part 18*b* whose thickness is thicker than another portion, but in the present embodiment, a portion between the first protrusions 13 on the bottom plate 18 is an intermediate protrusion 18*d*. The intermediate protrusion 18*d* has a height that is slightly higher than the first protrusion 13, and an upper surface thereof is flush with and connected to an upper surface of the first high-frequency terminal supporting part 16. Furthermore, a plurality of the first terminal stowing cavities 15 are formed on two sides of the intermediate protrusion 18*d* in line with the longitudinal direction, and a portion of each first terminal 61 is stowed in each first terminal stowing cavity 15. Furthermore, the inner recessed groove part 12*a* is formed, respectively, between two sides of the intermediate protrusion 18*d* and the first protrusions 13. Even in the present embodiment, a plurality of the first terminals 61 are disposed along each first protrusion 13 to form a pair of parallel terminal group rows.

Furthermore, the first terminal 61 according to the present embodiment is a member integrally formed by punching, bending, or the like on a conductive metal plate, similar to the first terminal 61 according to Embodiment 1 described above, and is provided with the retained part 63, the tail part 62 serving as a substrate connecting part connected to a lower end of the retained part 63, an upper side connecting part 65 connected to an upper end of the retained part 63, and a lower side connecting part 64 connected to a lower end of the upper side connecting part 65. The contacting part 65*a* is formed in the vicinity of the lower end of the upper side connecting part 65. Furthermore, the first terminal 61 is further provided with an inner side connecting part 66 connected to a tip end of the lower side connecting part 64. The inner side connecting part 66 is bent and connected to the lower side connecting part 64, and extends upwardly (Z-axis positive direction). A contacting part 66*a* curved so as to bulge outwardly in the width direction of the first connector 1 is formed in the vicinity of an upper end of the inner side connecting part 66. A contacting part 66*a* is a portion that contacts a second terminal 161 provided by the second connector 101. In other words, the first terminal 61 in the present embodiment is provided with the contacting part 65*a* of the upper side connecting part 65 and the contacting part 66*a* of the inner side connecting part 66, which face each other, and is configured to make two-point contact with the second terminal 161.

Furthermore, in the present embodiment, the shield plate 56 provided on the first connector 1 in the aforementioned Embodiment 1 is omitted. In accordance therewith, the shield plate stowing slits 13*b* formed in the first protrusion 13 and the shield plate stowing opening 18*a* formed in the bottom plate 18 in the Embodiment 1 described above are also omitted.

Alternatively, in the present embodiment, the first terminals 61 positioned at two ends in the longitudinal direction of each terminal group row are connected to a ground line and function as a first ground terminal 61G serving as a first inner side shield. In the example illustrated in the drawings, five first terminals 61 are disposed along each of the first protrusions 13 to form each terminal group row. Two first terminals 61 positioned at two ends in the longitudinal direction of each terminal group row function as the first ground terminal 61G, and three first terminals 61 positioned near a center in the longitudinal direction of each terminal group row are used to transmit a signal of a normal frequency. Note that the tail part 62 of the first terminal 61 that transmits a signal of a normal frequency is visible when viewed from the mating direction of the first connector 1, in other words, from the mating surface 1*a* side, whereas the tail part 62 of the first terminal 61 that functions as the first ground terminal 61G is not visible when viewed from the mating direction of the first connector 1. More specifically, as illustrated in FIG. 17, in the tail part 62 of the first terminal 61 that functions as the first ground terminal 61G, a lower surface is exposed while an upper surface is covered by the bottom plate 18, which is a portion of the first housing 11 and is not visible when viewed from the mating surface 1*a* side.

Furthermore, the present embodiment will be described as using a first solder sheet 91 as illustrated in FIG. 19 as a solder sheet serving as means for connecting the first shield 50, the first terminal 61, the first high-frequency terminal 71, and the like to a connection pad or the like of the first substrate. The first solder sheet 91 contains: a pair of elongated strip shaped long side sheets 91*a* extending linearly and continuously in the longitudinal direction of the first connector 1; two pairs of elongated strip shaped short side sheets 91*b* extending linearly and continuously in the width direction of the first connector 1; and a plurality of rectangular short length sheets 91*c* in which a long side extends in the width direction of the first connector 1 and a short side extends in the longitudinal direction of the first connector 1. Furthermore, each short side sheet 91*b* is connected to the long side sheet 91*a* at two ends thereof. Furthermore, the long side sheet 91*a* and short side sheets 91*b* do not necessarily have to extend continuously and may be intermittent, but will be described herein as extending continuously.

Furthermore, the pair of long side sheets 91*a* are provided on a lower surface of the flange part 54 corresponding to the long side parts 50*a* of the first shield 50, a pair of the short side sheets 91*b* are provided on the lower surface of the flange part 54 corresponding to the short side part 50*b* of the first shield 50, and the other pair of short side sheets 91*b* are provided on a lower surface of the tail part 62 of the first terminal 61 that functions as the first ground terminal 61G. Furthermore, each short length sheet 91*c* is provided on a lower surface of the tail part 62 of another first terminal 61 and to a lower surface of the tail part 72 of each first high-frequency terminal 71.

When the first solder sheet 91 provided in this manner is heated and melted and the first connector 1 is mounted on the surface of the first substrate, the bent part 52*a* and the flange part 54, which are continuously connected over the entire circumference to the lower end of the outer wall 52 that is continuous over the entire circumference of the first shield 50, are connected to the connection pads on the surface of the first substrate without a gap. Moreover, the tail part 62 of the first terminal 61 as the first ground terminal 61G is also connected to the connection pad on the surface of the first substrate without a gap. Therefore, the first terminal 61 that functions as the first ground terminal 61G is not a continuous plate-like member and has a plurality of gaps when viewed from the longitudinal direction of the first connector 1. Thus, although the electromagnetic shielding effect is lower than that of the long side part 50*a* and the short side part 50*b* of the first shield 50, the first terminals 61 are continuously connected to the connection pad on the surface of the first substrate without a gap using solder. Therefore, a sufficient electromagnetic shielding effect can be exhibited in practice.

Note that a configuration of another point of the first connector 1 in the present embodiment is the same as that of Embodiment 1 described above, and therefore, a description thereof is omitted.

Next, the configuration of the second connector 101 will be described.

Figure 20:
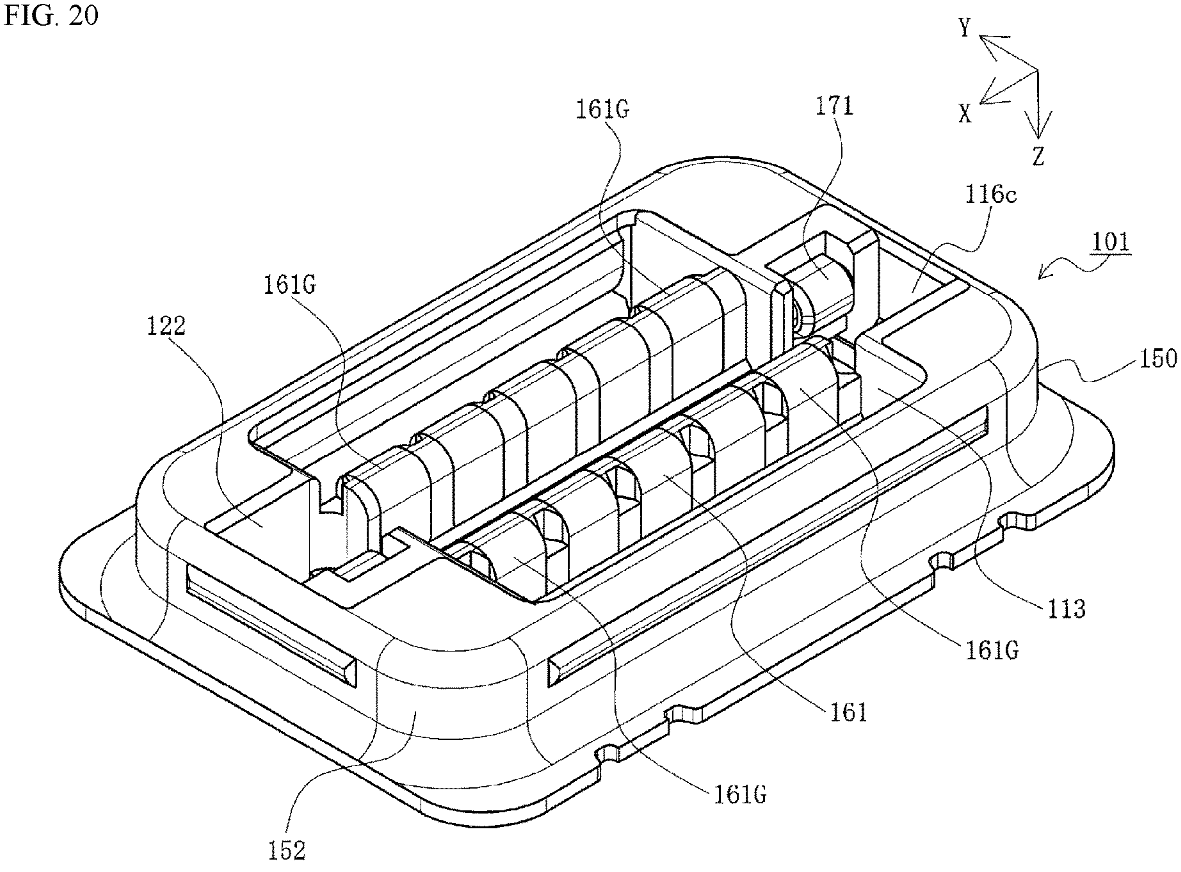
FIG. 20 is a perspective view of the second connector according to Embodiment 2.
Figure 21:
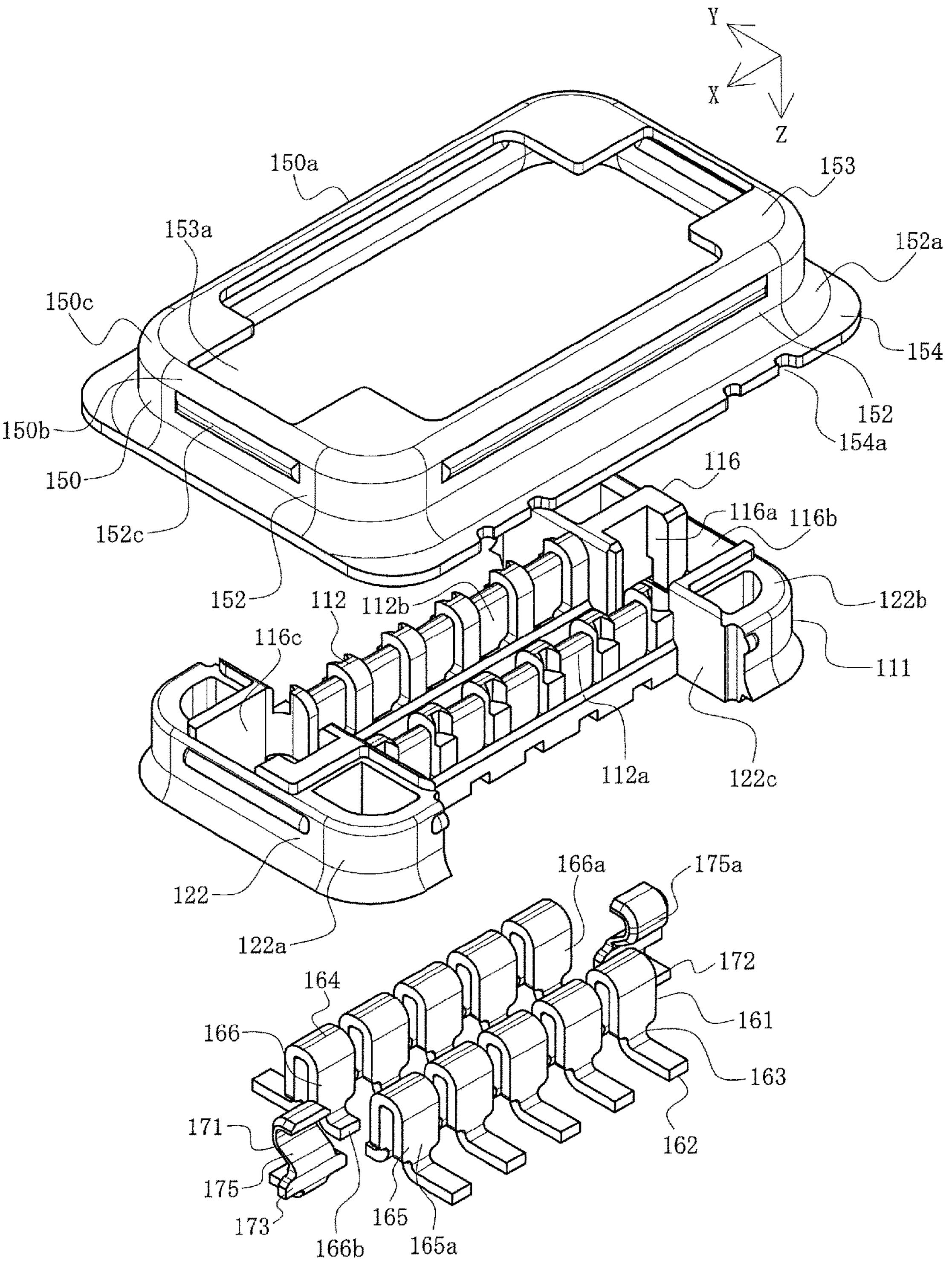
FIG. 21 is an exploded view illustrating the second connector according to Embodiment 2.
Figure 22:
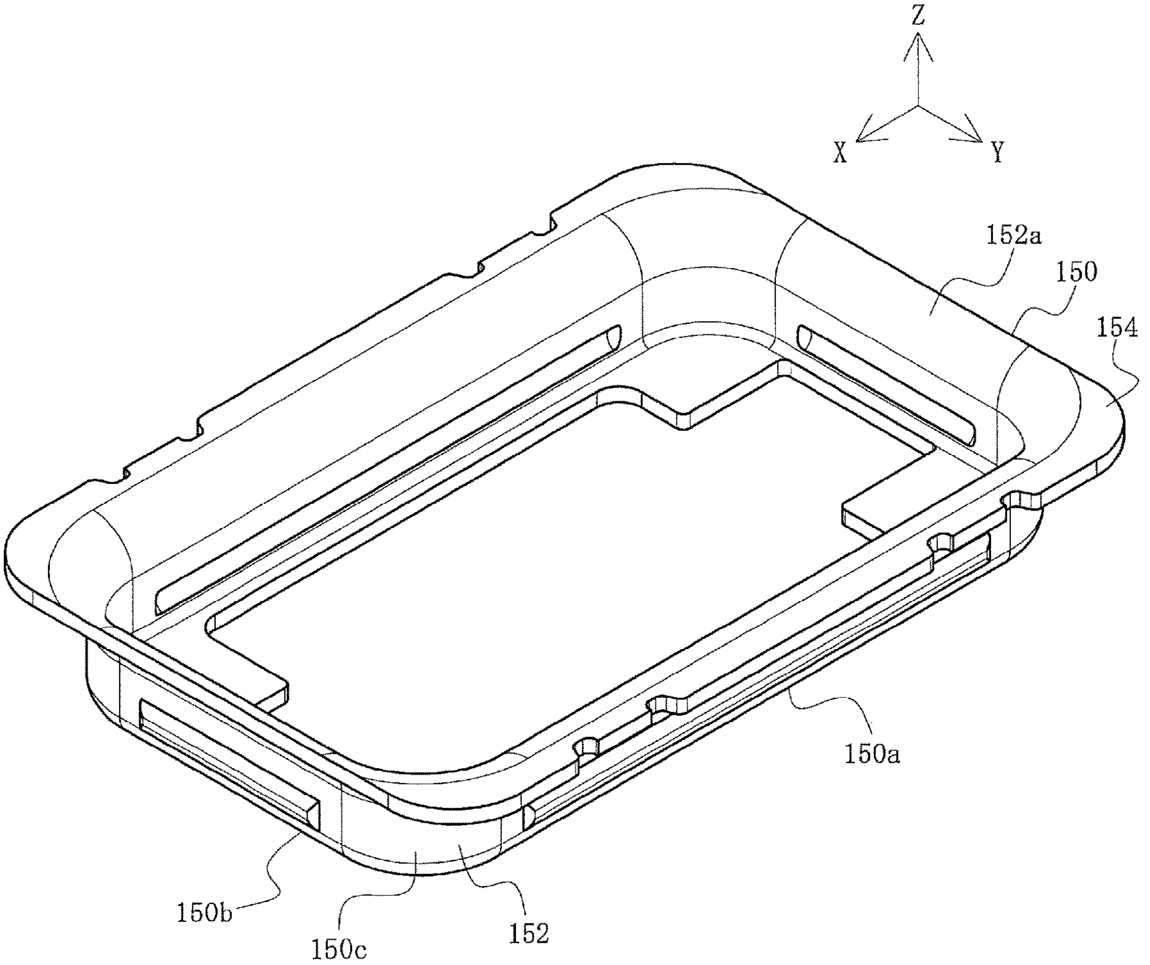
FIG. 22 is a perspective view of a second shield according to Embodiment 2.
Figure 23:
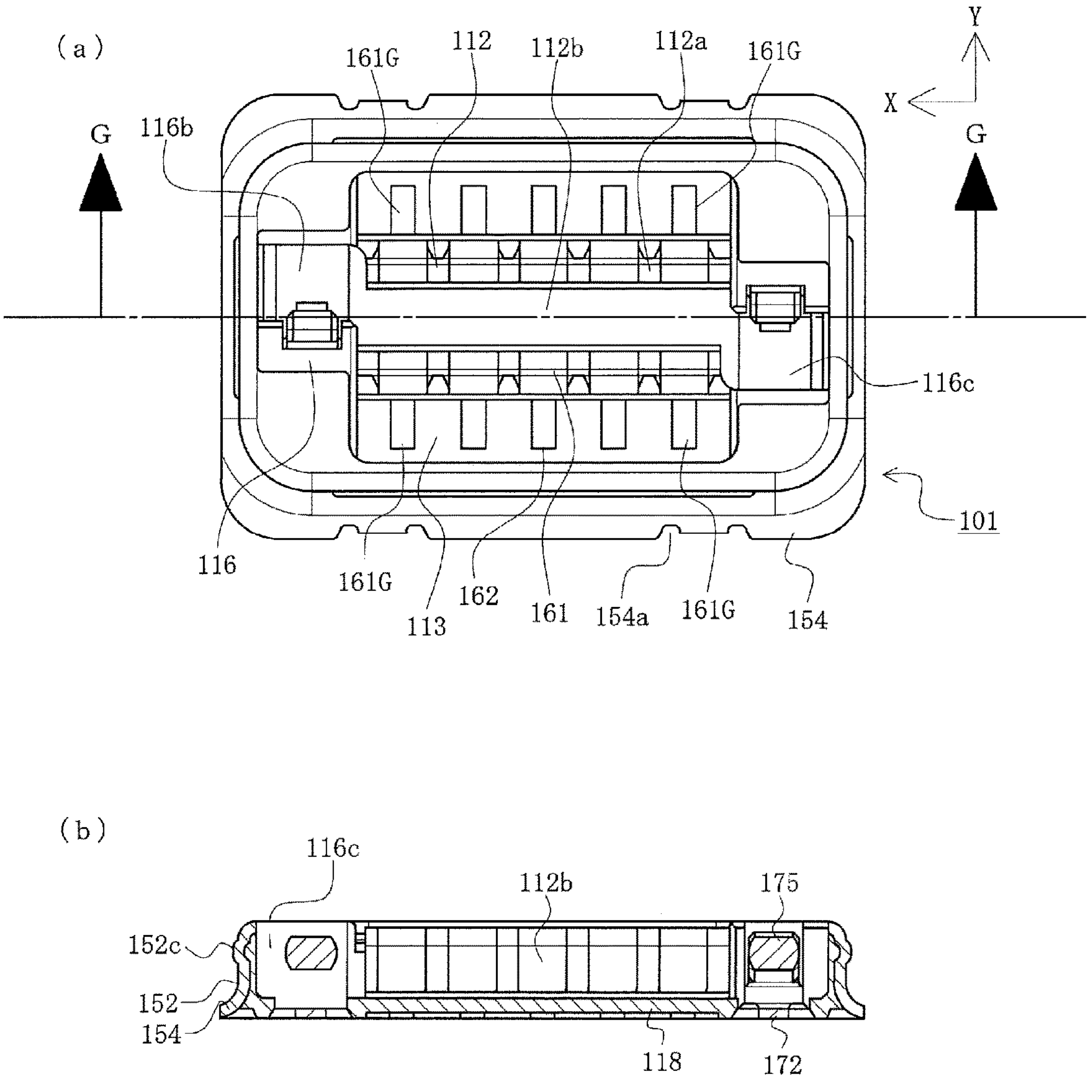
FIG. 23 is two views of the second connector according to Embodiment 2, where (a) is an upper surface view and (b) is a lateral cross-sectional view of a portion viewed along arrows G-G arrow in (a).
Figure 24:
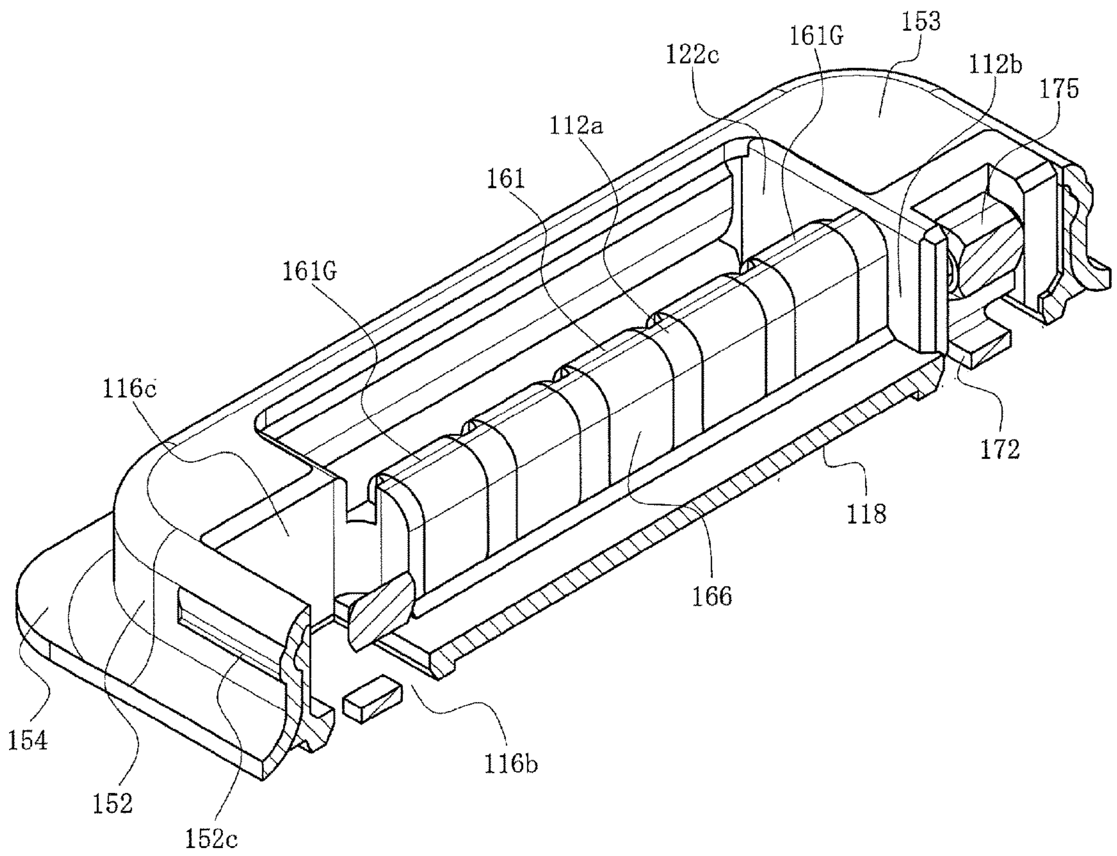
FIG. 24 is a perspective view illustrating the portion viewed along arrows G-G of the second connector according to Embodiment 2.
Figure 25:
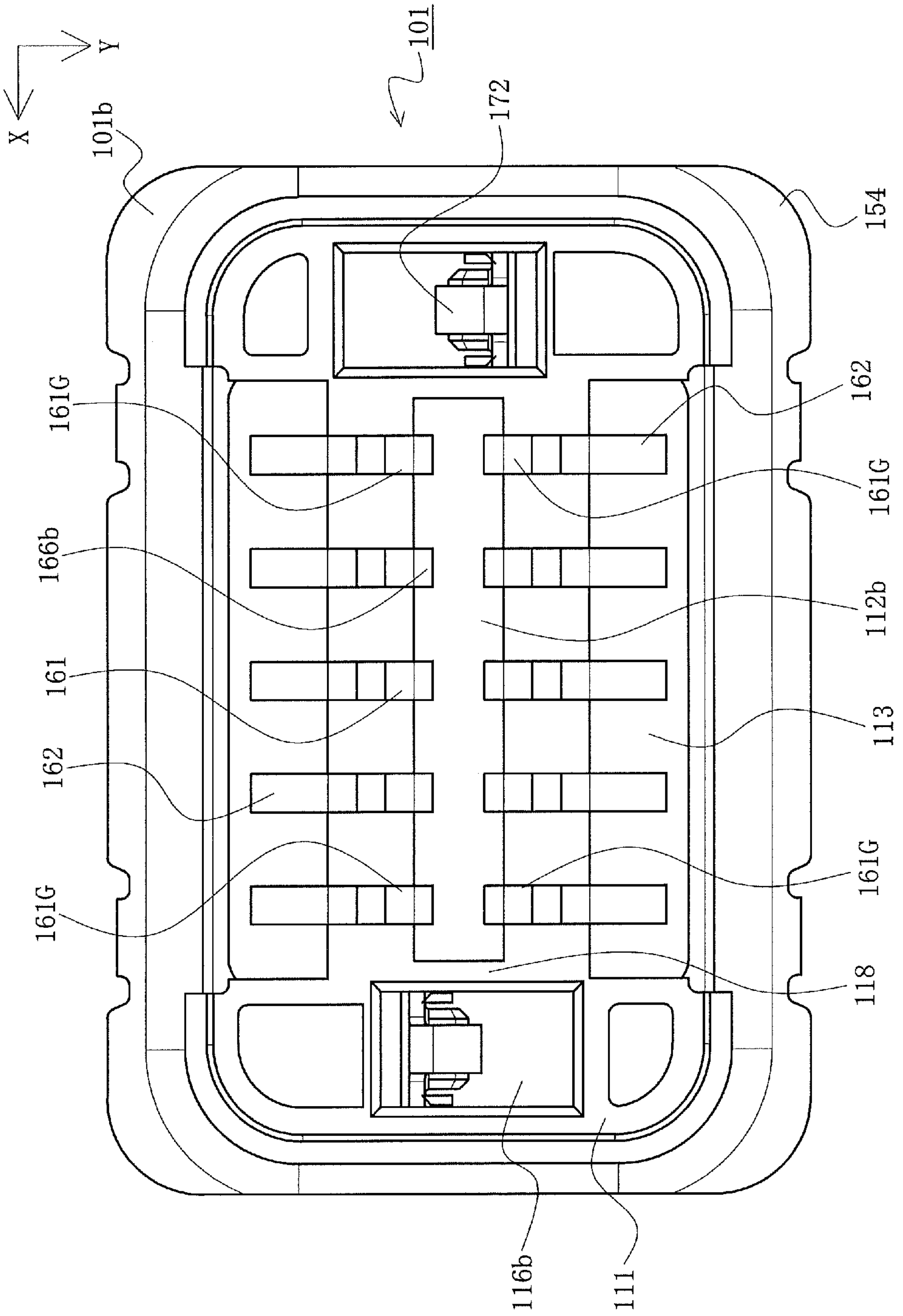
FIG. 25 is a lower surface view illustrating the second connector according to Embodiment 2.
Figure 26:
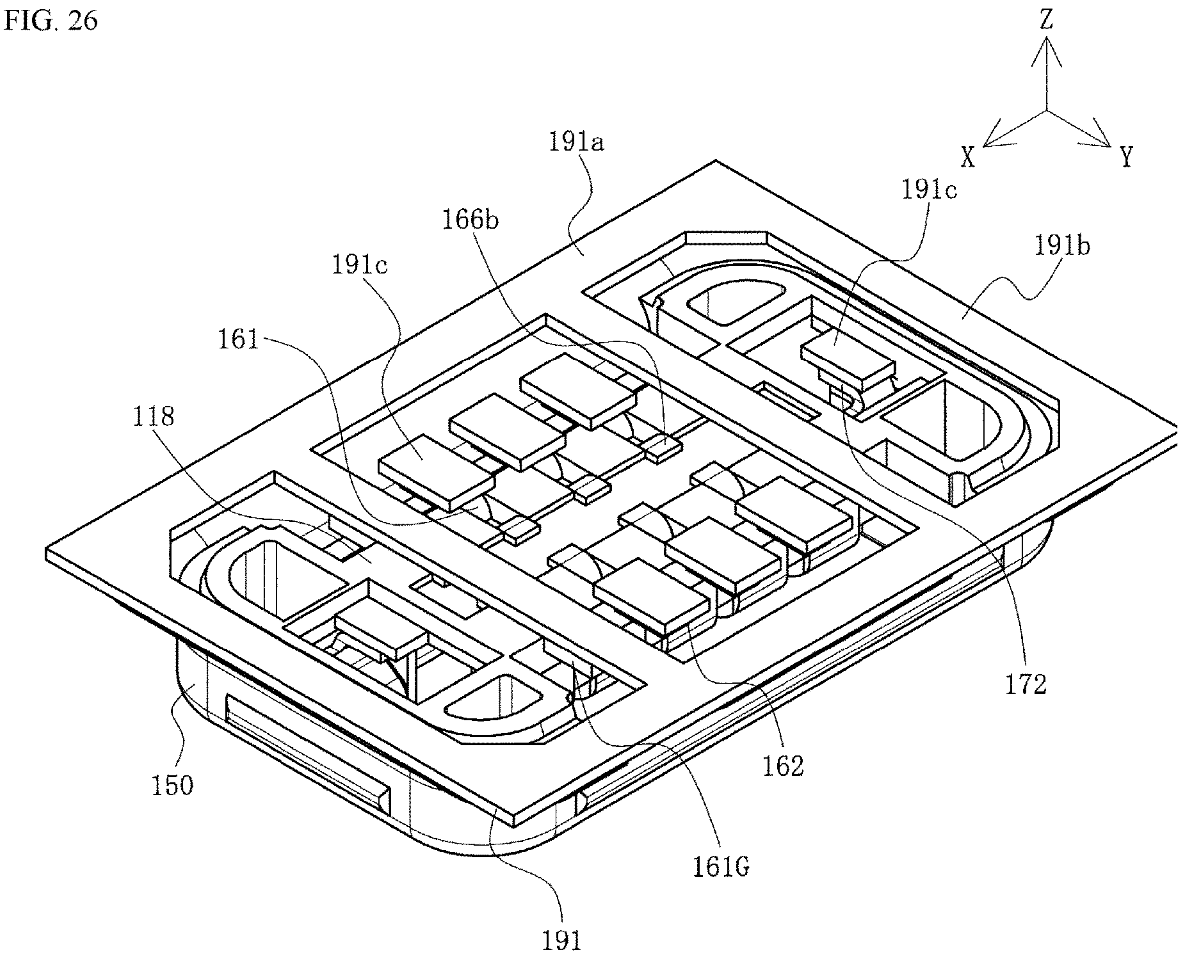
FIG. 26 is a perspective view illustrating a solder sheet provided on each substrate connecting part of the second connector according to Embodiment 2.

FIG. 20 is a perspective view of the second connector according to Embodiment 2; FIG. 21 is an exploded view of the second connector according to Embodiment 2; FIG. 22 is a perspective view of the second shield according to Embodiment 2; FIG. 23 is two views of the second connector according to Embodiment 2; FIG. 24 is a perspective view illustrating a portion viewed along arrow G-G of the second connector according to Embodiment 2; FIG. 25 is a lower surface view of the second connector according to Embodiment 2; and FIG. 26 is a perspective view illustrating a solder sheet provided to each substrate connecting part of the second connector according to Embodiment 2. In FIG. 23, (a) is an upper surface view and (b) is a cross-sectional view of the portion viewed along arrow G-G in (a).

As described above, the first terminal 61 in the present embodiment is provided with the contacting part 65*a* of the upper side connecting part 65 and the contacting part 66*a* of the inner side connecting part 66, which face each other, and is configured to make two-point contact with the second terminal 161. Therefore, the second terminal 161 according to the present embodiment is also configured to make a two-point contact with the first terminal 61.

Specifically, the second terminal 161 according to the present embodiment is a member integrally formed by punching, bending, or the like on an electrically conductive metal plate, similar to the second terminal 161 in Embodiment 1 described above, and is integrated with the second housing 111 by overmolding or insert molding. Furthermore, similar to the second terminal 161 in Embodiment 1 described above, the second terminal 161 is provided with: the retained part 163; the tail part 162 as a substrate connecting part connected to a first end of the retained part 163; a lower side connecting part 165 connected to a second end of the retained part 163 and extending in the vertical direction (Z-axis direction); and an upper side connecting part 164 connected to an upper end of the lower side connecting part 165. A surface of lower side connecting part 165 functions as the contacting part 165*a*. The second terminal 161 is further provided with the inner side connecting part 166 connected to a lower end of the upper side connecting part 164 and facing the lower side connecting part 165. The inner side connecting part 166 contains an inner side tail part 166*b* serving as a substrate connecting part that extends in the vertical direction, is bent and connected to a lower end thereof, and extends inwardly in the width direction of the second connector 101. Furthermore, the surface of the inner side connecting part 166 functions as the contacting part 166*a* that contacts the first terminal 61. Thus, the second terminal 161 in the present embodiment is provided with the contacting part 165*a* of the lower side connecting part 165 and the contacting part 166*a* of the inner side connecting part 166 and is configured to make two-point contact with the first terminal 61.

Furthermore, the shape of the second housing 111 is also partially changed. In Embodiment 1 described above, the center slit 112*b* of the second protrusion 112 is narrow. However, in the present embodiment, the center slit 112*b* is wider, and the interval is wider between the terminal supporting walls 112*a* on two sides on the left and right of the center slit 112*b*. Furthermore, while the second terminal 161 is disposed only on an outer side surface of each terminal supporting wall 112*a* in Embodiment 1 described above, in the present embodiment, the second terminal 161 is disposed on an outer side surface and inner side surface of each terminal supporting wall 112*a*. Specifically, in each second terminal 161, the contacting part 165*a*, which is a surface of the lower side connecting part 165, is exposed on an outer side surface of each terminal supporting wall 112*a*, and the contacting part 166*a*, which is a surface of the inner side connecting part 166, is exposed in the center slit 112*b* on an inner side surface of each terminal supporting wall 112*a*.

Furthermore, in the present embodiment, the inner wall 151 included on the second shield 150 of the second connector 101 in Embodiment 1 described above is omitted. In accordance therewith, the first high-frequency terminal stowing opening 153*a* formed in the upper wall 153 of the second shield 150 is an essentially rectangular opening in which three sides are demarcated by the upper wall 153, but one side facing inwardly in the longitudinal direction of the second connector 101 is open.

Alternatively, in the present embodiment, the second terminals 161 positioned at two ends in the longitudinal direction of each terminal group row are connected to a ground line and functions as a second ground terminal 161G serving as a second inner side shield. In the example illustrated in the drawings, five second terminals 161 are disposed along each of the terminal supporting walls 112*a* to form each terminal group row. Two second terminals 161 positioned at two ends in the longitudinal direction of each terminal group row function as the second ground terminal 161G, and three second terminals 161 positioned near a center in the longitudinal direction of each terminal group row are used to transmit a signal of a normal frequency.

Furthermore, the present embodiment will be described as using a second solder sheet 191 as illustrated in FIG. 26 as a solder sheet serving as means for connecting the second shield 150, the second terminal 161, the second high-frequency terminal 171, and the like to a connection pad or the like of the second substrate. The second solder sheet 191 contains: a pair of elongated strip shaped long side sheets 191*a* extending linearly and continuously in the longitudinal direction of the second connector 101; two pairs of elongated strip shaped short side sheets 191*b* extending linearly and continuously in the width direction of the second connector 101; and a plurality of rectangular short length sheets 191*c* in which a long side extends in the width direction of the second connector 101 and a short side extends in the longitudinal direction of the second connector 101. Furthermore, each short side sheet 191*b* is connected to the long side sheet 191*a* at two ends thereof. Furthermore, the long side sheet 191*a* and short side sheets 191*b* do not necessarily have to extend continuously and may be intermittent but will be described herein as extending continuously.

Furthermore, the pair of long side sheets 191*a* are provided on a lower surface of the flange part 154 corresponding to the long side parts 150*a* of the second shield 150, a pair of the short side sheets 191*b* are provided on the lower surface of the flange part 154 corresponding to the short side part 150*b* of the second shield 150, and the other pair of short side sheets 191*b* are provided on a lower surface of the inner side tail part 166*b* and tail part 162 of the second terminal 161 that functions as the second ground terminal 161G. Furthermore, each short length sheet 191*c* is provided on a lower surface of the tail part 162 of another second terminal 161 and to a lower surface of the tail part 172 of each second high-frequency terminal 171.

When the second solder sheet 191 provided in this manner is heated and melted and the second connector 101 is mounted on the surface of the second substrate, the bent part 152*a* and the flange part 154, which are continuously connected over the entire circumference to the lower end of the outer wall 152 that is continuous over the entire circumference of the second shield 150, are connected to the connection pads on the surface of the second substrate without a gap. Moreover, the inner side tail part 166*b* and tail part 162 of the second terminal 161 as the second ground terminal 161G is also connected to the connection pad on the surface of the second substrate without a gap. Therefore, the second terminal 161 that functions as the second ground terminal 161G is not a continuous plate-like member and has a plurality of gaps when viewed from the longitudinal direction of the second connector 101. Thus, although the electromagnetic shielding effect is lower than that of the long side part 150*a* and the short side part 150*b* of the second shield 150, the second terminals 161 are continuously connected to the connection pad on the surface of the second substrate without a gap using solder. Therefore, a sufficient electromagnetic shielding effect can be exhibited in practice.

Note that a configuration of another point of the second connector 101 in present embodiment is the same as that of Embodiment 1 described above, and therefore, a description thereof is omitted.

Subsequently, the operation of mating together the first connector 1 and the second connector 101 with the above configuration will be described.

Figure 27:
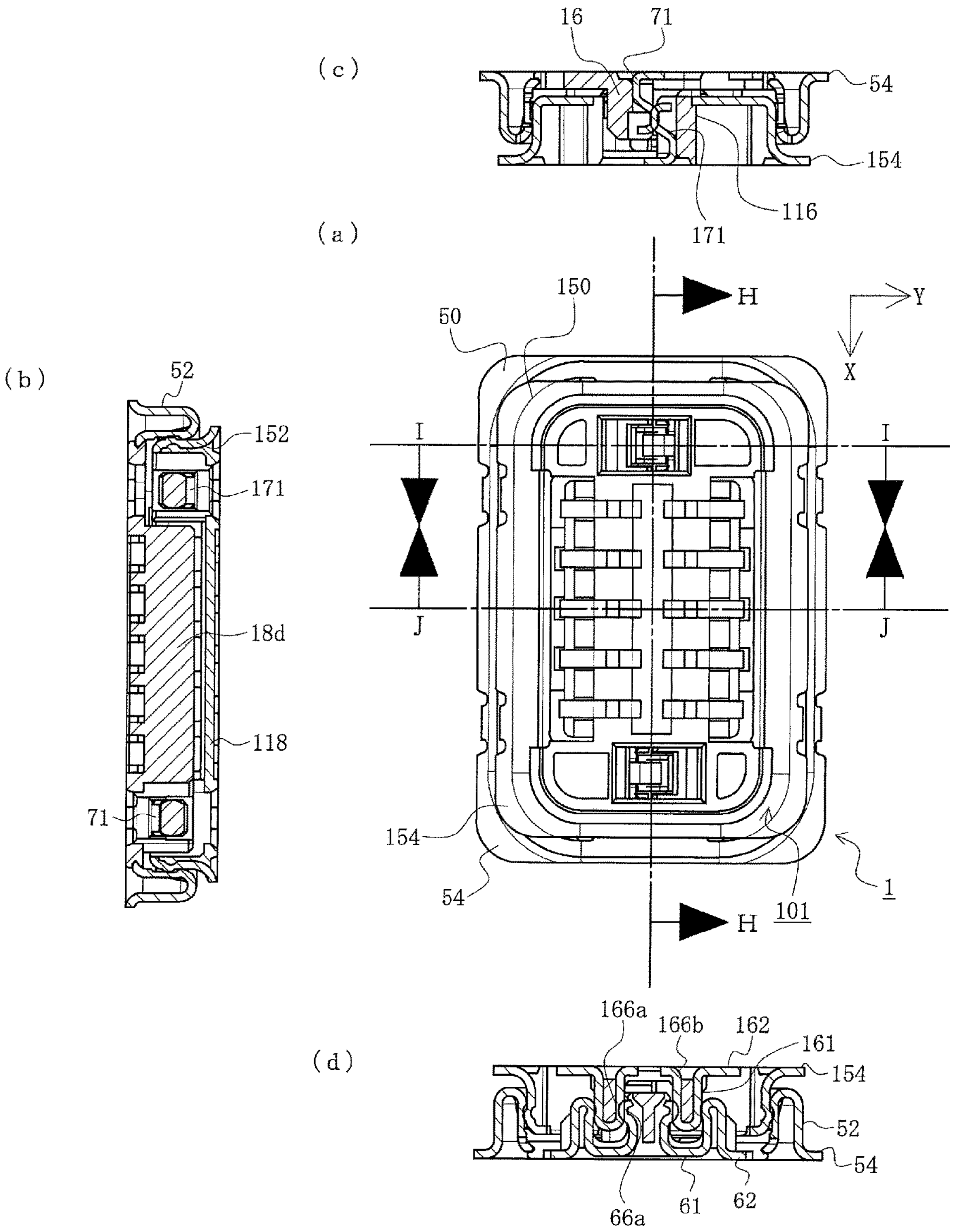
FIG. 27 is four views of a state in which the first connector and the second connector according to Embodiment 2 are mated, where (a) is a plan view, (b) is a cross-sectional view of a portion viewed along arrow H-H in (a), (c) is a cross-sectional view of a portion viewed along arrow I-I in (a), and (d) is a cross-sectional view of a portion viewed along arrow J-J in (a).
Figure 28:
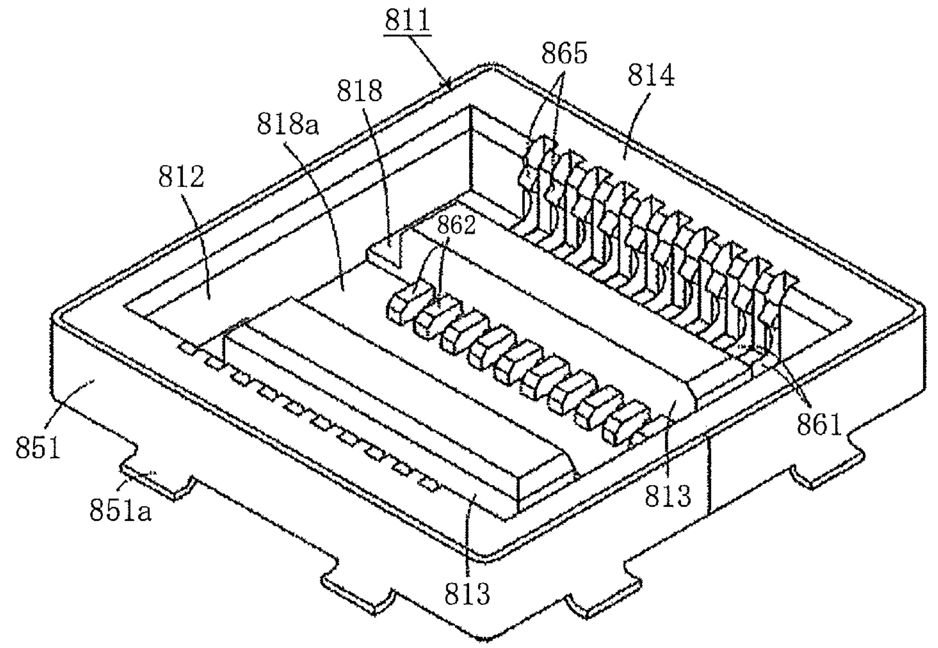
FIG. 28 is a perspective view illustrating a conventional connector.

FIG. 27 is a four views of a state in which the first connector and second connector according to Embodiment 2 are mated. Note that in the drawings, (a) is a plan view, (b) is a cross-sectional view of a portion viewed along arrow H-H in (a), (c) is a cross-sectional view of a portion viewed along arrow I-I in (a), and (d) is a cross-sectional view of a portion viewed along arrow J-J in (a).

In the present embodiment, as illustrated in the drawings, when the mating of the first connector 1 and the second connector 101 is completed, the first terminal 61 and the second terminal 161 conduct electricity, and the first high-frequency terminal 71 and the second high-frequency terminal 171 achieve an electrically conductive state. Specifically, each of the terminal supporting walls 112*a* on two sides on the left and right of the second protrusion 112 of the second housing 111 is inserted into each of the inner recessed groove parts 12*a* on two sides on the left and right of the first housing 11. The contacting part 65*a* of the first terminal 61 protruding into the inner recessed groove part 12*a* from an inner side surface of the first protrusion 13 contacts the contacting part 165*a* of the second terminal 161 exposed on an outer side surface of the terminal supporting walls 112*a* of the second protrusion 112. The contacting part 66*a* bent so as to bulge outwardly in the width direction of the first connector 1 from two sides of the intermediate protrusion 18*d* contacts the contacting part 166*a* of the second terminal 161 exposed on an inner side surface of the terminal supporting wall 112*a* of the second protrusion 112.

At this time, the lower side connecting part 64 of the first terminal 61 and a vicinity thereof have an essentially U-shaped shape viewed from the first connector 1 and are elastically deformable, such that the interval between the contacting part 65*a* and the contacting part 66*a* facing each other are elastically expandable. Therefore, the interval between the contacting part 65*a* and the contacting part 66*a* is elastically pushed apart by the second terminal 161 inserted therebetween and as a reaction thereof, the second terminal 161 is elastically sandwiched from two sides by the contacting part 65*a* and the contacting part 66*a*. As a result, the contacting part 65*a* of the first terminal 61 and the contacting part 165*a* of the second terminal 161, which correspond to each other, as well as the contacting part 66*a* of the first terminal 61 and the contacting part 166*a* of the second terminal 161 maintain contact and do not separate even when subjected to shock or vibration and thus can maintain a stable state of electrical conduction. Furthermore, the mutually corresponding first terminal 61 and second terminal 161 are in a state of contact at two points, a so-called two-point contact, and even if contact at one point is released, the contact at the other point is maintained, and thus a contact state can be stably maintained.

Furthermore, when the protruding end part 122 is inserted into the mating recess 12*b*, the first high-frequency terminal supporting part 16 positioned in the mating recess 12*b* is inserted into the first high-frequency terminal stowing recess 116*c* of the protruding end part 122, and the contacting part 75*a* of the first high-frequency terminal 71 and the contacting part 175*a* of the second high-frequency terminal 171 contact each other. Moreover, the first ground terminal 61G positioned adjacent to the mating recess 12*b* and the second ground terminal 161G positioned adjacent to the protruding end part 122 contact each other and conduct electricity. Therefore, the first high-frequency terminal 71 and second high-frequency terminal 171, which are in mutual contact, have entire circumferences that are continuously surrounded by the inner wall 51, outer wall 52, and first ground terminal 61G of the first shield 50 and the outer wall 152 and second ground terminal 161G of the second shield 150, and moreover, are doubly surrounded, thereby being extremely effectively shielded. Therefore, the impedance of the transmission line of a signal from the tail part 72 of the first high-frequency terminal 71 to the tail part 172 of the second high-frequency terminal 171 is stabilized, and favorable SI characteristics can be achieved.

Thus, in the present embodiment, an upper surface of the tail part 62 of the first ground terminal 61G is covered by the first housing 11, and a lower surface of the tail part 62 of the first ground terminal 61G is exposed. Thus, the first ground terminal 61G approaches the first high-frequency terminal 71 to an extent that an upper surface of the tail part 62 is covered by a portion of the first housing 11 such as the bottom plate 18, and therefore, the first high-frequency terminal 71 can be effectively shielded.

Furthermore, the first ground terminal 61G has the same shape as the first terminal 61. Therefore, the cost of the first ground terminal 61G can be reduced, and thus the cost of the first connector 1 can be reduced.

Furthermore, in the present embodiment, the second ground terminal 161G has the same shape as the second terminal 161. Therefore, the cost of the second ground terminal 161G can be reduced, and thus the cost of the second connector 101 can be reduced.

Note that an operation of mating the first connector 1 and the second connector 101 in present embodiment and configurations and effects of other points of the first connector 1 and the second connector 101 are the same as those of Embodiment 1 described above, and therefore, descriptions thereof are omitted.

Moreover, the disclosure herein describes features relating to suitable exemplary embodiments. Various other embodiments, modifications, and variations within the scope and spirit of Scope of the Patent Claims appended hereto will naturally be conceived of by those skilled in the art upon review of the disclosure herein. For example, the staggered arrangement of the terminals does not have to be regular. In addition, the arrangement of the terminals on the left and right half body parts need not be the same. Furthermore, the left and right half body parts need not be axially symmetric.

INDUSTRIAL APPLICABILITY

The present disclosure can be applied to a connector and a connector pair.

The invention claimed is:

1. A connector that mates with a mating connector, comprising:
 connector main body;
 a terminal attached to the connector main body, the terminal including a substrate connecting part which is configured to be connected to a first connection pad provided on a surface of a circuit board;
 a high-frequency terminal attached to the connector main body;
 a shield surrounding an entire circumference of the connector main body;
 an inner side shield integrally formed with the connector main body and extending in a width direction of the connector between the terminal and the high-frequency terminal, the inner side shield comprising a center part and a pair of side parts, each connected to a side of the center part, wherein
 a substrate connecting part of the inner side shield is disposed at a position overlapping the substrate connecting part of the terminal as viewed from a longitudinal direction of the connector; and
 viewed from the width direction, the pair of side parts are vertical and in a same plane, and the center part comprises at least one inclined part that is out of plane with the pair of side parts.

2. The connector according to claim 1, wherein
 the shield includes an outer wall, an upper wall, and an outwardly extending flange part connected to a lower end of the outer wall; and
 the connector main body includes a protruding end part disposed at both ends in the longitudinal direction of the connector, and the upper wall covering at least a portion of an upper surface of the protruding end part.

3. The connector according to claim 2, wherein the outer wall and flange part are connected around the entire circumference of the connector main body.

4. The connector according to claim 2, wherein
 the inner side shield is connected to the upper wall; and
 the high-frequency terminal is attached to the protruding end part, and the entire circumference of the high-frequency terminal is surrounded by the outer wall and the inner side shield.

5. The connector according to claim 1, wherein the inner side shield has the same shape as the terminal.

6. A connector pair comprising:
 a first connector including a first connector main body, a first terminal attached to the first connector main body, a first high-frequency terminal attached to the first connector main body, a first shield surrounding an entire circumference of the first connector main body, and a first inner side shield attached to the first connector main body and extending in a width direction of the first connector between the first terminal and the first high-frequency terminal, the first inner side shield comprising a center part and a pair of side parts, each connected to a side of the center part,
 wherein, viewed from the width direction, the pair of side parts are vertical and in a same plane, and the center part comprises at least one inclined part that is out of plane with the pair of side parts; and
 a second connector that mates with the first connector, the second connector including a second connector main body, a second terminal attached to the second connector main body, a second high-frequency terminal attached to the second connector main body, a second shield surrounding an entire circumference of the second connector main body, and a second inner side shield integrally formed with the second connector main body and extending in a width direction of the second connector between the second terminal and the second high-frequency terminal;
 wherein when the first connector and the second connector are mated, the first shield and the second shield are in contact and electrically conducting, and the first inner side shield and the second inner side shield are in contact and electrically conducting.

7. A connector that mates with a mating connector, comprising:
 a connector main body;
 a terminal attached to the connector main body;
 a high-frequency terminal attached to the connector main body;
 a shield surrounding an entire periphery of the connector main body, the shield includes an outer wall, an inner wall, a coupling part, and an outwardly extending flange portion, the inner wall being substantially parallel to the outer wall on an inner side of the outer wall, the coupling part couples an upper end of the outer wall and an upper end of the inner wall, the outwardly extending flange portion is connected to a lower end of the outer wall, the inner wall defining a recess having a periphery surrounded by the inner wall, the recess being configured to accommodate the mating connector therein, wherein the outer wall and the flange portion are continuous over the entire periphery of the connector main body and the inner wall is separated into inner wall parts by a plurality of spaced apart notches, wherein the inner wall parts are deformable in a direction approaching or separating from the outer wall; and
 a shield plate attached to the connector main body, wherein the shield plate extends in a width direction of the connector between the terminal and the high-frequency terminal, the shield plate comprising a center part and a pair of side parts, each connected to a side of the center part,
 wherein, viewed from the width direction, the pair of side parts are vertical and in a same plane, and the center part comprises at least one inclined part that is out of plane with the pair of side parts.

8. The connector according to claim 7, wherein
 the terminal has a substrate connecting part which is visible from a mating surface side of the connector; and
 further comprising an inner side shield attached to the connector main body and extending in a width direction of the connector between the terminal and the high-frequency terminal, the inner side shield having a substrate connecting part which is not visible from the mating surface side.

9. The connector according to claim 8, wherein the inner wall parts include a curved part.

10. The connector according to claim 8, wherein an upper surface of the substrate connecting part of the inner side shield is covered with the connector main body, and a lower surface of the substrate connecting part of the inner side shield is exposed.

11. The connector according to claim 10, wherein the inner side shield has the same shape as the terminal.

12. The connector according to claim 7, wherein a linear part and a curved part of the inner wall are separated by notches.

13. A connector that mates with a mating connector, comprising:

a connector main body having opposite first and second ends and including a bottom plate, a protrusion protruding upwardly from an upper surface of the bottom plate in a longitudinal direction of the connector main body, a first protruding end part protruding upwardly from the upper surface of the bottom plate at the first end of the connector main body in the longitudinal direction, a second protruding end part protruding upwardly from the upper surface of the bottom plate at the second end of the connector main body in the longitudinal direction, wherein the protrusion is narrower than the first and second protruding end parts, each protruding end part having an outer wall surface that faces an outer side in a longitudinal direction of the connector, two sides in a width direction of the connector, an upper surface that faces a mating surface side of the mating connector, and an inner wall surface that faces an inner side in the longitudinal direction of the connector and faces the protrusion;

a terminal attached to the protrusion;

a high-frequency terminal attached to the first protruding end part; and a shield surrounding an entire periphery of the connector main body, the shield includes an outer wall, an inner wall, an upper wall, and an outwardly extending flange portion, the upper wall coupling an upper end of the outer wall and an upper end of the inner wall, the outwardly extending flange portion connected to a lower end of the outer wall, the upper wall covers at least a part of the upper surface of each protruding end part, and the inner wall covers at least a part of the inner wall surface of each protruding end part.

14. The connector according to claim 13, wherein the outer wall of the shield and the flange portion are continued over the entire periphery of the connector main body.

15. The connector according to claim 13, wherein the protruding end part is coupled to a part of the outer wall of the shield, the inner wall of the shield, and the upper wall of the shield.

16. The connector according to claim 13, wherein entire periphery of the high-frequency terminal is surrounded by the shield.

17. The connector according to claim 13, wherein the high-frequency terminal is a first high-frequency terminal; and further comprising a second high-frequency terminal attached to the second protruding end part, wherein an entire periphery of the second high-frequency terminal is surrounded by the shield.

18. A connector pair comprising:

a first connector including a first connector main body, a first terminal attached to the first connector main body, a first high-frequency terminal attached to the first connector main body, and a first shield surrounding an entire periphery of the first connector main body, and the first shield including an outer wall, an inner wall, a coupling part, and an outwardly extending flange portion, the inner wall is substantially parallel to the outer wall on an inner side of the outer wall, the coupling part couples an upper end of the outer wall and an upper end of the inner wall, the outwardly extending flange portion is connected to a lower end of the outer wall, and the inner wall defining a recess having a periphery surrounded by the inner wall, the inner wall including a linear part of a linear shape and a curved part of a curved shape, a second connector including a second connector main body, a second terminal attached to the second connector main body, a second high-frequency terminal attached to the second connector main body, and a second shield surrounding an entire periphery of the second connector main body, the second connector being fitted to the first connector, the second connector main body having opposite first and second ends and including a bottom plate, a protrusion protruding upwardly from an upper surface of the bottom plate in a longitudinal direction of the second connector main body, a first protruding end part protruding upwardly from the upper surface of the bottom plate at the first end of the second connector main body in the longitudinal direction, a second protruding end part protruding upwardly from the upper surface of the bottom plate at the second end of the second connector main body in the longitudinal direction, wherein the protrusion is narrower than the protruding end parts, each protruding end part having an outer wall surface that faces an outer side in a longitudinal direction of the second connector, two sides in a width direction of the second connector, an upper surface that faces a mating surface side of the first connector, and an inner wall surface that faces an inner side in the longitudinal direction of the second connector and faces the protrusion, and wherein the second shield includes an outer wall, an inner wall, an upper wall, and an outwardly extending flange portion, the upper wall of the second shield coupling an upper end of the outer wall of the second shield and an upper end of the inner wall of the second shield, the outwardly extending flange portion of the second shield connected to a lower end of the outer wall of the second shield, the second shield being accommodated in the recess of the first shield, and the upper wall covers at least a part of the upper surface of each protruding end part, and the inner wall covers at least a part of the inner wall surface of each protruding end part.

19. The connector pair according to claim 18, wherein the first connector further includes a shield plate attached to the first connector main body, the shield plate extending in a width direction of the first connector between the first terminal and the first high-frequency terminal, the shield plate configured to come into contact with an inner wall of the second shield.

* * * * *